United States Patent
Bai et al.

(10) Patent No.: US 11,438,048 B2
(45) Date of Patent: Sep. 6, 2022

(54) METHODS AND APPARATUS FOR NEW BEAM INFORMATION REPORTING

(71) Applicant: QUALCOMM Incorporated, San Diego, CA (US)

(72) Inventors: Tianyang Bai, Bridgewater, NJ (US); Tao Luo, San Diego, CA (US); Jung Ho Ryu, Fort Lee, NJ (US); Kiran Venugopal, Raritan, NJ (US); Yan Zhou, San Diego, CA (US); Junyi Li, Chester, NJ (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/805,642

(22) Filed: Feb. 28, 2020

(65) Prior Publication Data
US 2020/0313746 A1 Oct. 1, 2020

Related U.S. Application Data

(60) Provisional application No. 62/826,919, filed on Mar. 29, 2019.

(51) Int. Cl.
*H04B 7/06* (2006.01)
*H04W 76/19* (2018.01)
(Continued)

(52) U.S. Cl.
CPC ........ *H04B 7/0695* (2013.01); *H04W 72/046* (2013.01); *H04W 74/02* (2013.01);
(Continued)

(58) Field of Classification Search
CPC ....... H04B 7/0695; H04B 7/088; H04L 5/001; H04L 5/0091; H04L 5/0025; H04W 74/02;
(Continued)

(56) References Cited

U.S. PATENT DOCUMENTS

2018/0368126 A1 12/2018 Islam et al.
2019/0306850 A1* 10/2019 Zhang ................. H04B 7/0639
(Continued)

OTHER PUBLICATIONS

CATT: "Remaining Issues on DL Beam Failure Recovery," 3GPP Draft, 3GPP TSG RAN WG1 Meeting #92, R1-1801722, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 3, 2018, Feb. 17, 2018 (Feb. 17, 2018), XP051397703, 2 pages, Retrieved from the Internet: URL: http://www.3gpp.org/ftp/tsg%5Fran/WG1%5FRL1/TSGR1%5F92/Docs/ [retrieved on Feb. 17, 2018].

(Continued)

*Primary Examiner* — Jianye Wu
(74) *Attorney, Agent, or Firm* — Procopio, Cory, Hargreaves & Savitch LLP

(57) ABSTRACT

A UE detects a beam failure on a first CC. The UE determines whether to transmit a BFRQ to a base station on the first CC or a second CC. The UE determines whether to include a NBI report in the BFRQ. The UE transmits the BFRQ to the base station on the first CC or the second CC. The base station receives a BFRQ from a UE on a first CC or a second CC. The base station determines a new beam for the first CC, where the determination of the new beam is based on a RACH procedure when the BFRQ is received on the first CC or a NBI report in the BFRQ when the BFRQ is received on the second CC. The base station initiates a BFR procedure with the UE for the first CC based on the BFRQ and the new beam determination.

56 Claims, 12 Drawing Sheets

(51) Int. Cl.
H04W 72/04 (2009.01)
H04W 74/02 (2009.01)
H04W 80/02 (2009.01)
H04W 74/08 (2009.01)

(52) U.S. Cl.
CPC ....... H04W 74/0833 (2013.01); H04W 76/19 (2018.02); H04W 80/02 (2013.01)

(58) Field of Classification Search
CPC ........... H04W 74/004; H04W 74/0833; H04W 80/02; H04W 72/046; H04W 76/19; H04W 76/15; H04W 16/28
See application file for complete search history.

(56) References Cited

U.S. PATENT DOCUMENTS

| 2020/0314722 | A1* | 10/2020 | Kyung | H04B 7/0695 |
| 2021/0058998 | A1* | 2/2021 | Yuan | H04W 72/0413 |

OTHER PUBLICATIONS

Huawei, et al., "Beam Failure Recovery for Scell," 3GPP Draft, 3GPP TSG RAN WG1 Ad-Hoc Meeting 1901, R1-1900846, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593692, 6 pages, Retrieved from the Internet: URL: http://www.3gpp.org/ftp/Meetings%5F3GPP%5FSYNC/RAN1/Docs/R1%2D1900846%2Ezip retrieved on Jan. 20, 2019] paragraph [2.2.3].
International Search Report and Written Opinion—PCT/US2020/020689—ISA/EPO—dated Jun. 16, 2020.
NEC: "Discussion on Beam Failure Recovery", 3GPP Draft, 3GPP TSG RAN WG1 Meeting #95, R1-1812646, Discussion on Beam Failure Recovery, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018, XP051554602, 2 pages, Retrieved from the Internet: URL: http://www.3gpp.org/ftp/Meetings%5F3GPP%5FSYNC/RAN1/Docs/R1%2D1812646%2Ezip. [retrieved on Nov. 11, 2018] Sections 2-3.
NTT Docomo., et al., "Discussion on Multi-beam Enhancement", 3GPP Draft, 3GPP TSG RAN WG1 #96, R1-1902813, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019, XP051600508, 22 pages,Retrieved from the Internet: URL: http://www.3gpp.org/ftp/tsg%5Fran/WG1%5FRL1/TSGR1%5F96/Docs/R1%2D1902813%2Ezip , [retrieved on Feb. 15, 2019], paragraph [0002]—paragraph [02.4].
QUALCOMM Incorporated: "Enhancements on Multi-beam Operation," 3GPP Draft, 3GPP TSG-RAN WG1 Meeting #96, R1-1903044, Enhancements on Multi-beam Operation, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, (Feb. 16, 2019), XP051600740, 19 pgs., URL: http://www.3gpp.org/ftp/tsg%5Fran/WG1% 5FRL1/TSGR1%5F96/Docs/R1%2D1903044%2Ezip [retrieved Feb. 16, 2019] paragraph [0002]—paragraph [02.5].
VIVO: "Further Discussion on Multi-Beam Operation", 3GPP Draft, 3GPP TSG RAN WG1 Meeting #96, R1-1901703, Further Discussion on Multi-Beam Operation, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, (Feb. 16, 2019), XP051599399, 7 pgs, Retrieved from Internet: URL: http://www.3gpp.org/ftp/tsg%5Fran/WG1%5FRL1/TSGR1%5F96/Docs/R1%2D1901703%2Ezip [retrieved Feb. 16, 2019] the whole document.

* cited by examiner

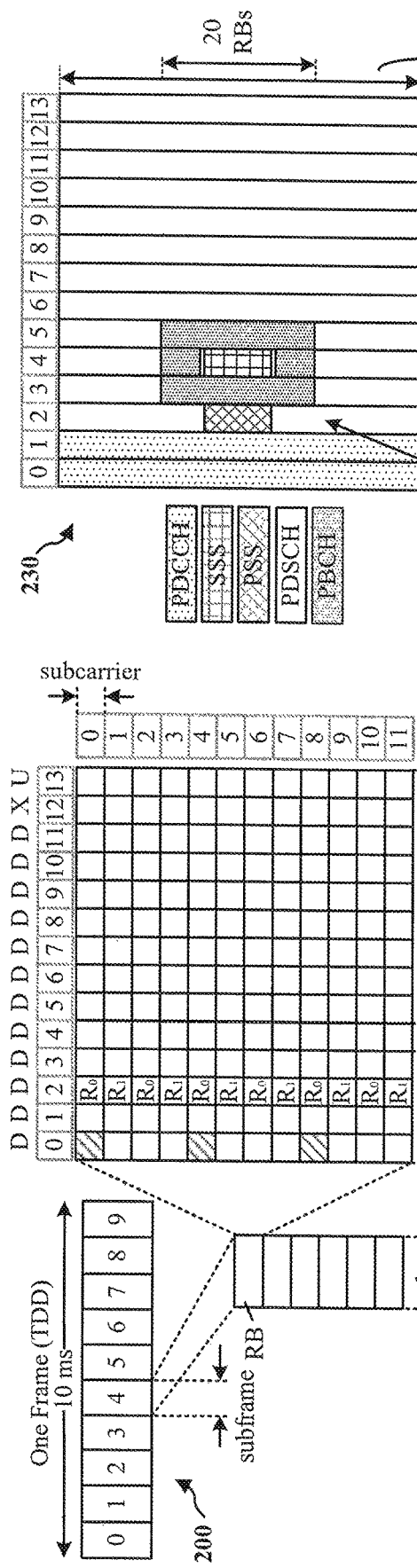
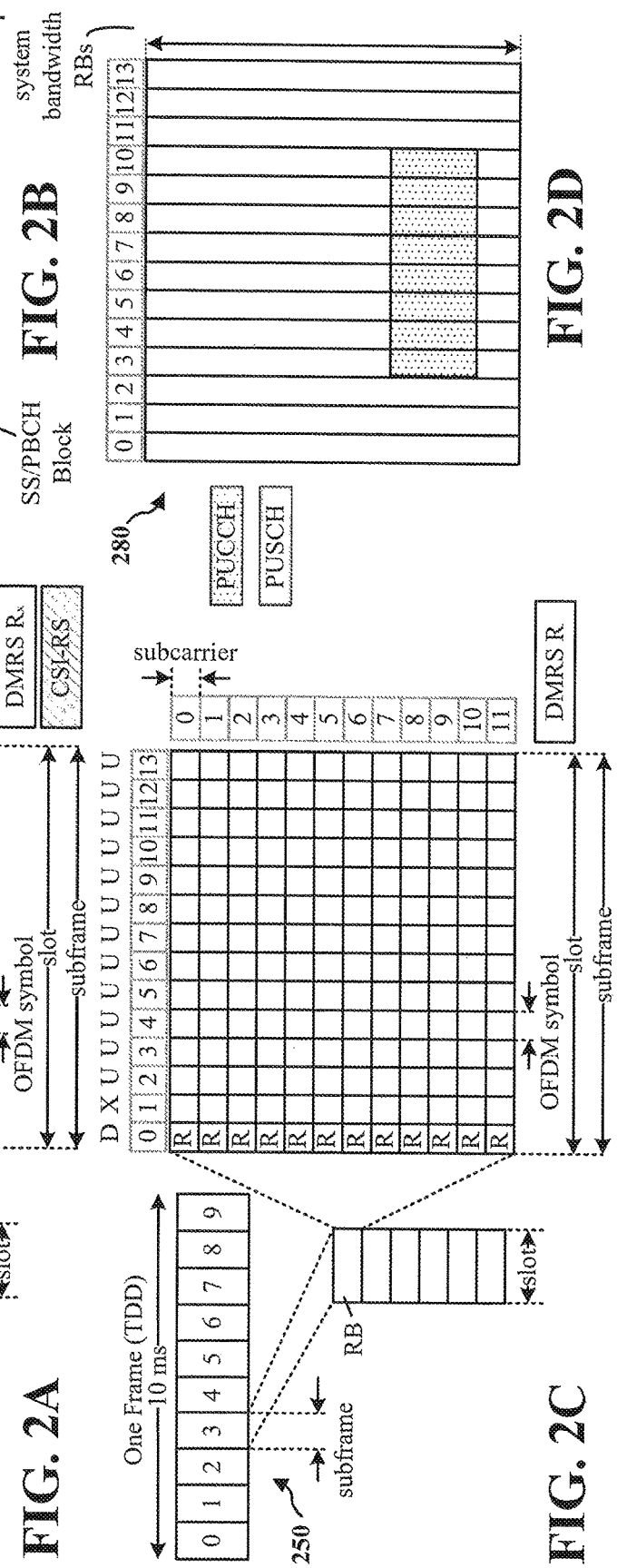
FIG. 2A
FIG. 2B
FIG. 2C
FIG. 2D

METHODS AND APPARATUS FOR NEW BEAM INFORMATION REPORTING

CROSS REFERENCE TO RELATED APPLICATION(S)

This application claims the benefit of U.S. Provisional Application Ser. No. 62/826,919, entitled "METHODS AND APPARATUS FOR NEW BEAM INFORMATION REPORTING" and filed on Mar. 29, 2019, which is expressly incorporated by reference herein in its entirety.

BACKGROUND

Technical Field

The present disclosure relates generally to communication systems, and more particularly, to methods and devices for communicating based on beam failure recovery.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus can detect a beam failure on a first component carrier (CC). The apparatus can also determine whether to transmit a beam failure recovery request (BFRQ) to a base station on the first CC or a second CC. In some aspects, the determination to transmit the BFRQ on the first CC or a second CC can be based on whether a new beam for the first CC is identified or can be based on a resource configuration for the first CC or the second CC. Additionally, the apparatus can determine whether to include a new beam information (NBI) report in the BFRQ. The apparatus can also transmit the BFRQ to the base station on the first CC or the second CC. In some aspects, the BFRQ can indicate there is no new beam when the new beam for the first CC is not identified.

In another aspect of the disclosure, a method, a computer-readable medium, and an apparatus are provided for wireless communication at a base station. The apparatus can receive a BFRQ from a UE on a first CC or a second CC. The BFRQ can indicate a beam failure on the first CC. The apparatus can also determine a new beam for the first CC. In some aspects, the determination of the new beam can be based on a RACH procedure when the BFRQ is received on the first CC or can be based on a NBI report in the BFRQ when the BFRQ is received on the second CC. Moreover, the apparatus can initiate a beam failure recovery (BFR) procedure with the UE for the first CC based on the BFRQ and the determination of the new beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
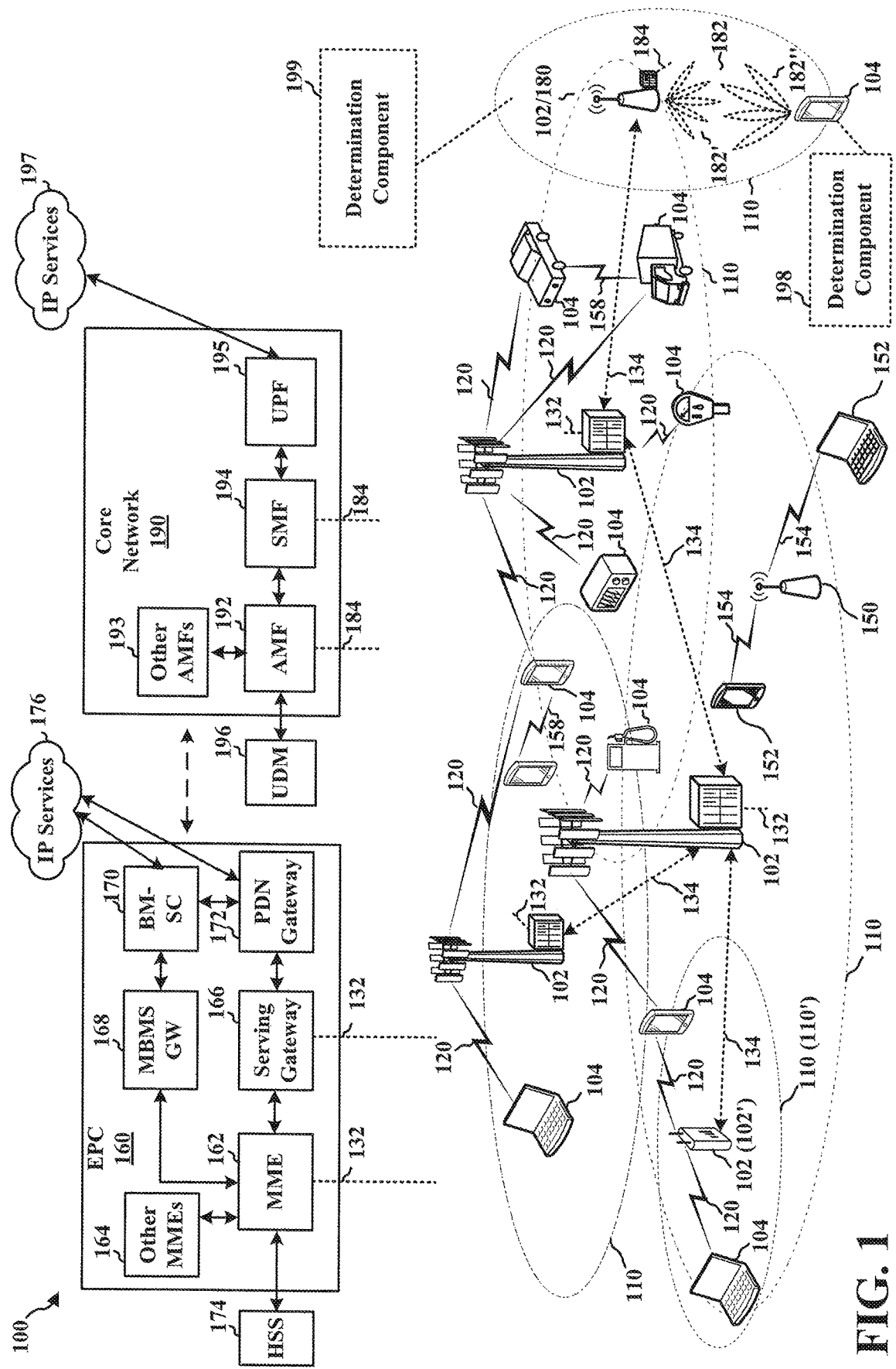
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may include a determination component 198 configured to detect a beam failure on a first CC. The determination component 198 may also be configured to determine whether to transmit a BFRQ to a base station on the first CC or a second CC, where the determination to transmit the BFRQ on the first CC or a second CC can be based on whether a new beam for the first CC is identified or can be based on a resource configuration for the first CC or the second CC. Additionally, the determination component 198 may be configured to determine whether to include a NBI report in the BFRQ. The determination component 198 may also be configured to transmit the BFRQ to the base station on the first CC or the second CC, where the BFRQ can indicate there is no new beam when the new beam for the first CC is not identified.

Additionally, the base station 102/180 may include a determination component 199 configured to receive a BFRQ from a UE on a first CC or a second CC. The BFRQ can indicate a beam failure on the first CC. The determination component 199 may also be configured to determine a new beam for the first CC. The determination of the new beam can be based on a RACH procedure when the BFRQ is received on the first CC or can be based on a NBI report in the BFRQ when the BFRQ is received on the second CC. Moreover, the determination component 199 may be configured to initiate a BFR procedure with the UE for the first CC based on the BFRQ and the determination of the new beam.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
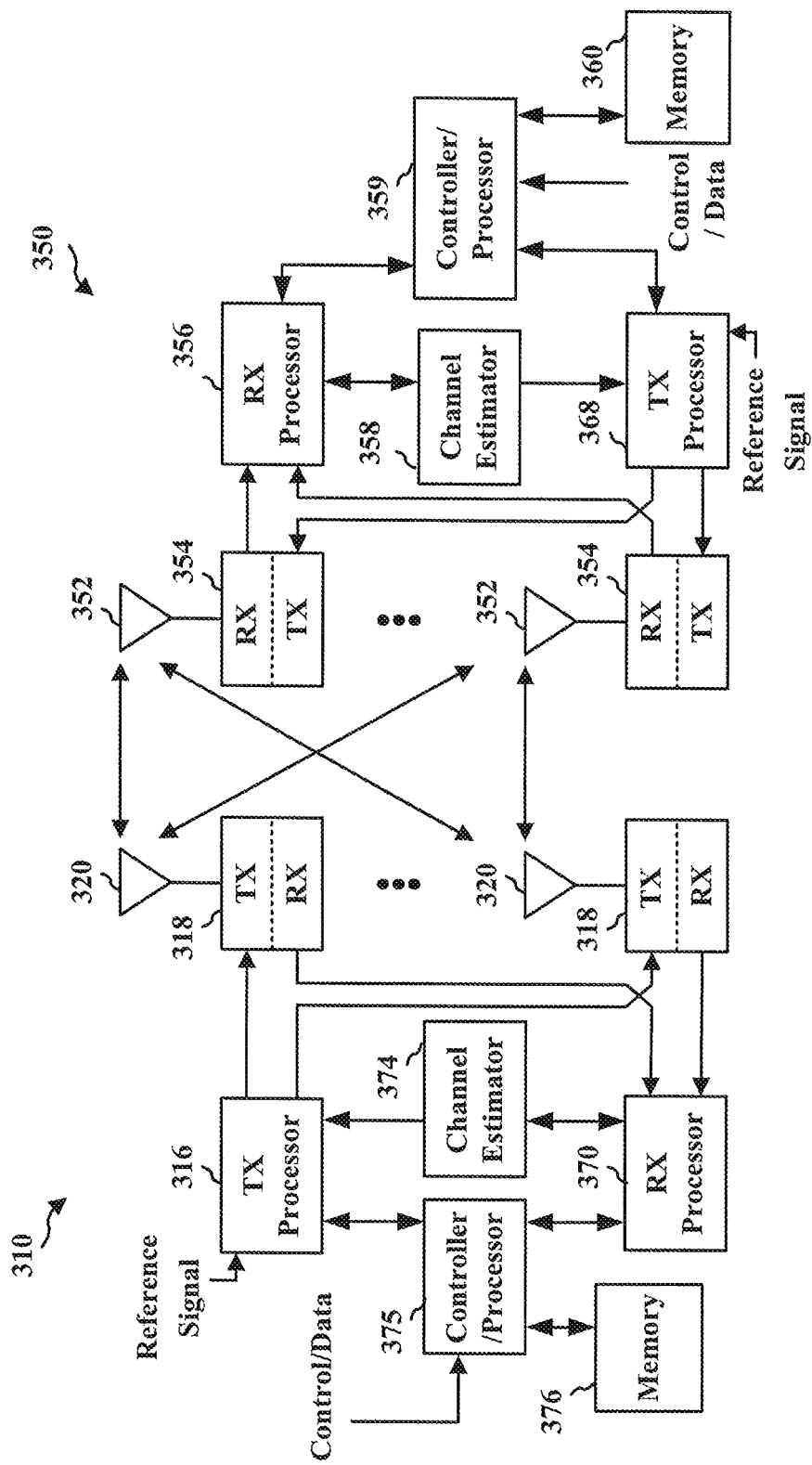
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. For instance, TX processor 368, RX processor 356, and/or controller/processor 359 may be configured to detect a beam failure on a first CC. TX processor 368, RX processor 356, and/or controller/processor 359 may also be configured to determine whether to transmit a BFRQ to a base station on the first CC or a second CC, where the determination to transmit the BFRQ on the first CC or a second CC can be based on whether a new beam for the first CC is identified or can be based on a resource configuration for the first CC or the second CC. Additionally, TX processor 368, RX processor 356, and/or controller/processor 359 may be configured to determine whether to include a NBI report in the BFRQ. TX processor 368, RX processor 356, and/or controller/processor 359 may also be configured to transmit the BFRQ to the base station on the first CC or the second CC, where the BFRQ can indicate there is no new beam when the new beam for the first CC is not identified.

At least one of the TX processor 316, the RX processor 370, and the controller/processor 375 may be configured to perform aspects in connection with 198 of FIG. 1. For instance, TX processor 316, RX processor 370, and/or controller/processor 375 may be configured to receive a BFRQ from a UE on a first CC or a second CC. The BFRQ can indicate a beam failure on the first CC. TX processor 316, RX processor 370, and/or controller/processor 375 may also be configured to determine a new beam for the first CC. The determination of the new beam can be based on a RACH procedure when the BFRQ is received on the first CC or can be based on a NBI report in the BFRQ when the BFRQ is received on the second CC. Moreover, TX processor 316, RX processor 370, and/or controller/processor 375 may be configured to initiate a BFR procedure with the UE for the first CC based on the BFRQ and the determination of the new beam.

In carrier aggregation, a base station can allocate to a UE both DL and UL resources on an aggregated resource comprising two or more component carriers (CCs). In some aspects, the number of aggregated carriers can be different in DL and UL. The individual CCs can also include different frequencies or bandwidths. In some instances, aggregation can be arranged using contiguous CCs within the same operating frequency band, i.e., intra-band contiguous aggregation. Non-contiguous allocation can be either intra-band, i.e., the component carriers belong to the same operating frequency band and have a gaps in-between, or inter-band, i.e., the component carriers belong to different operating frequency bands. In some aspects, the different CCs can be in different cells. For instance, one CC can be a primary cell (PCell) and another CC can be a secondary cell (SCell).

In beam failure recovery (BFR), the UE and/or base station attempt to recover one or more beams that have ceased functioning or operating correctly. In carrier aggregation, a BFR can attempt to recover a beam in a CC or cell, e.g., a PCell or an SCell. For BFR in an SCell, a beam failure recovery request (BFRQ) can be conveyed if the UE declares a beam failure to the base station. In some aspects, a UE can convey new beam information (NBI) during a BFR procedure. For instance, a UE can convey NBI if a new candidate beam RS and a corresponding threshold are configured. Accordingly, the UE can report a new beam indication during SCell BFR when a candidate RS list and RSRP threshold are configured. Additionally, a UE can convey NBI if a channel quality of a new or replacement beam is greater than or equal to a threshold. In some aspects, during SCell beam recovery, a UE can report the NBI, e.g., by sending a NBI report.

In some aspects, if the BFRQ for an SCell is sent from an SCell via a random access channel (RACH) procedure, then the NBI report may not be needed. For example, in a RACH procedure, the choice of the RACH beam may indicate a new beam or beam index. As such, a NBI report may not be needed to indicate a potential new or replacement beam. In some aspects, there may be inconsistencies regarding whether a new or replacement beam that is not identified may be included as a state of new beam information. Further, there may be inconsistencies regarding whether a new or replacement beam that is not identified is greater than or equal to threshold.

Figure 4:
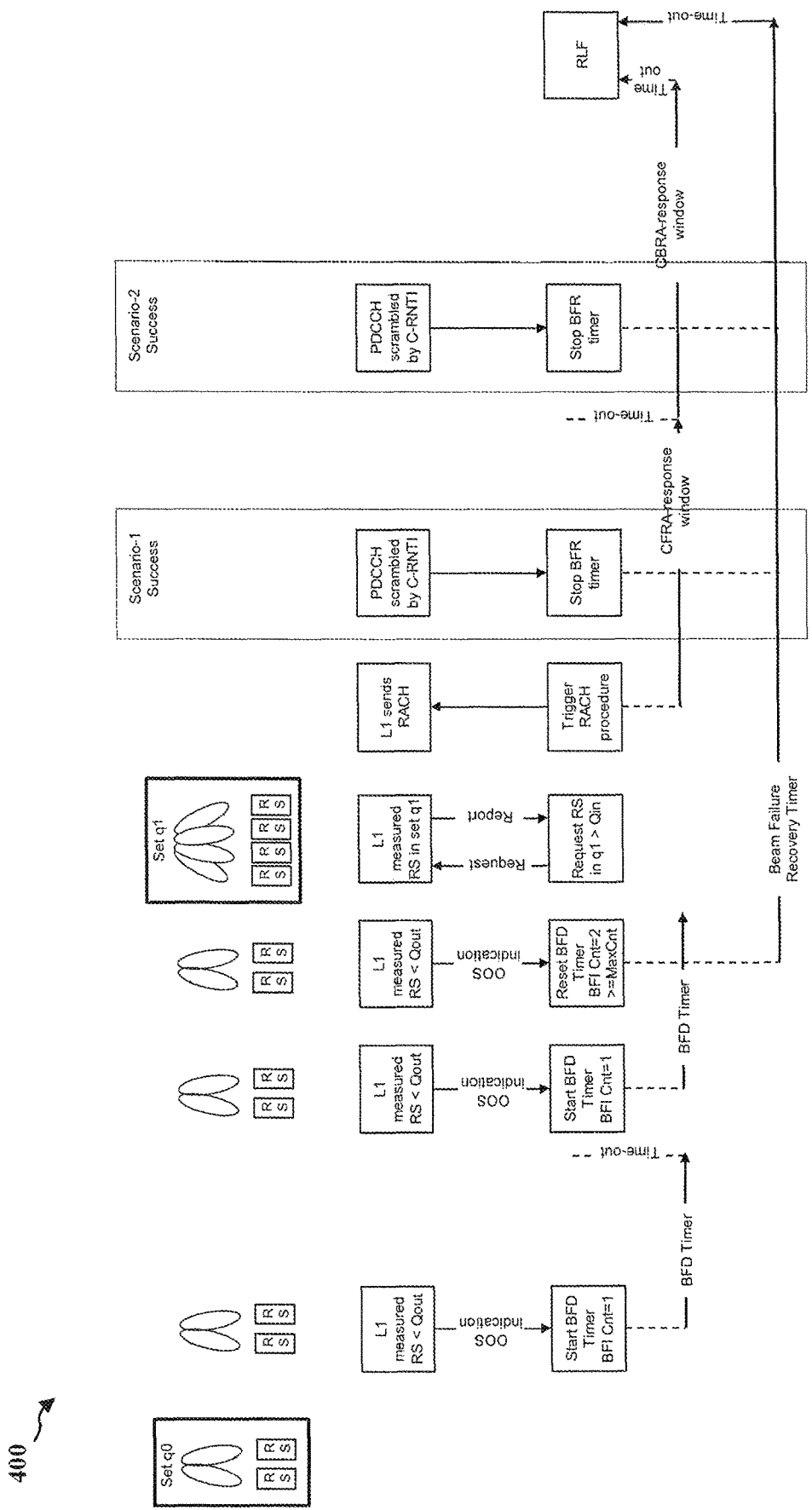
FIG. 4 illustrates a wireless communication system in accordance with certain aspects of the present disclosure.

FIG. 4 illustrates a wireless communication system 400 in accordance with certain aspects of the present disclosure. For example, FIG. 4 shows a beam recovery procedure for a PCell. More specifically, FIG. 4 displays a BFR procedure for a PCell from the UE side. For instance, the top row of blocks in FIG. 4 corresponds to the physical (PHY) layer of the UE. The bottom row of blocks in FIG. 4 corresponds to a higher layer, or medium access control (MAC) layer, of the UE. In some aspects, the UE can first monitor some RS, e.g., the q0 RS in the upper left corner of FIG. 4, or a beam failure detection (BFD) RS. By monitoring the RS of BFD RS, the UE can detect whether the current beam will fail or not. Once the beam failure is detected, then the UE can go into a BFR procedure.

In some aspects of a BFR procedure, the UE can configure a new candidate beam RS, e.g., the q1 RS near the top of FIG. 4. The UE can also measure this new candidate beam RS in parallel with the BFD RS that was monitored for beam failure. Once the beam failure is detected, the UE can determine whether the new candidate beam RS is configured. If it is configured, then the UE can identify the measurement of the new candidate beam RS to determine if there is a new or replacement beam that is larger than a predefined threshold. If there is a new or replacement beam larger than a predefined threshold, then the UE may try to perform a RACH procedure using a predefined time or frequency resource, e.g., that is specific to the new or replacement beam.

In some aspects, the UE can use a RACH beam as the new or replacement beam for the BFR. The UE can also use the RACH beam for the subsequent transmissions, e.g., on a physical downlink control channel (PDCCH). In further aspects, if a contention free RACH (CFRA) or pre-defined RACH is timing out, i.e., a BFR timer is expiring, then the UE can perform a contention based RACH (CBRA), where the UE can select any new beam. If the CBRA is successful, then the UE can use the selected RACH beam. In some instances, the UE may continue to try to identify a RACH beam until the BFR timer expires. Also, when the UE selects a new candidate beam for BFR, the new candidate beam can be used during a RACH procedure with the base station. When a new candidate beam is used in the RACH procedure, there may be no need to convey the NBI explicitly in a report, as the RACH procedure already indicates the new candidate or replacement beam.

As indicated above, in some aspects, if a RS is below a certain threshold value a certain amount of times, this can trigger a BFR procedure. BFR procedures can occur on any CC, e.g., either on a PCell or SCell. Also, a RACH procedure can indicate a new candidate or replacement beam, such that the RACH includes the NBI, so an explicit NBI report may not need to be transferred.

In some aspects, one CC can utilize another CC to perform a BFR procedure. For instance, an SCell can perform beam failure recovery using a PCell. For example, a UE can indicate an SCell BFR report on a PCell. In these instances, a MAC control element (MAC-CE) format may be defined. Further, in SCell beam recovery using a PCell, a base station can trigger an UL recovery for beam pairing. Also, RACH resources may not be needed for SCell beam recovery using a PCell.

Figure 5:
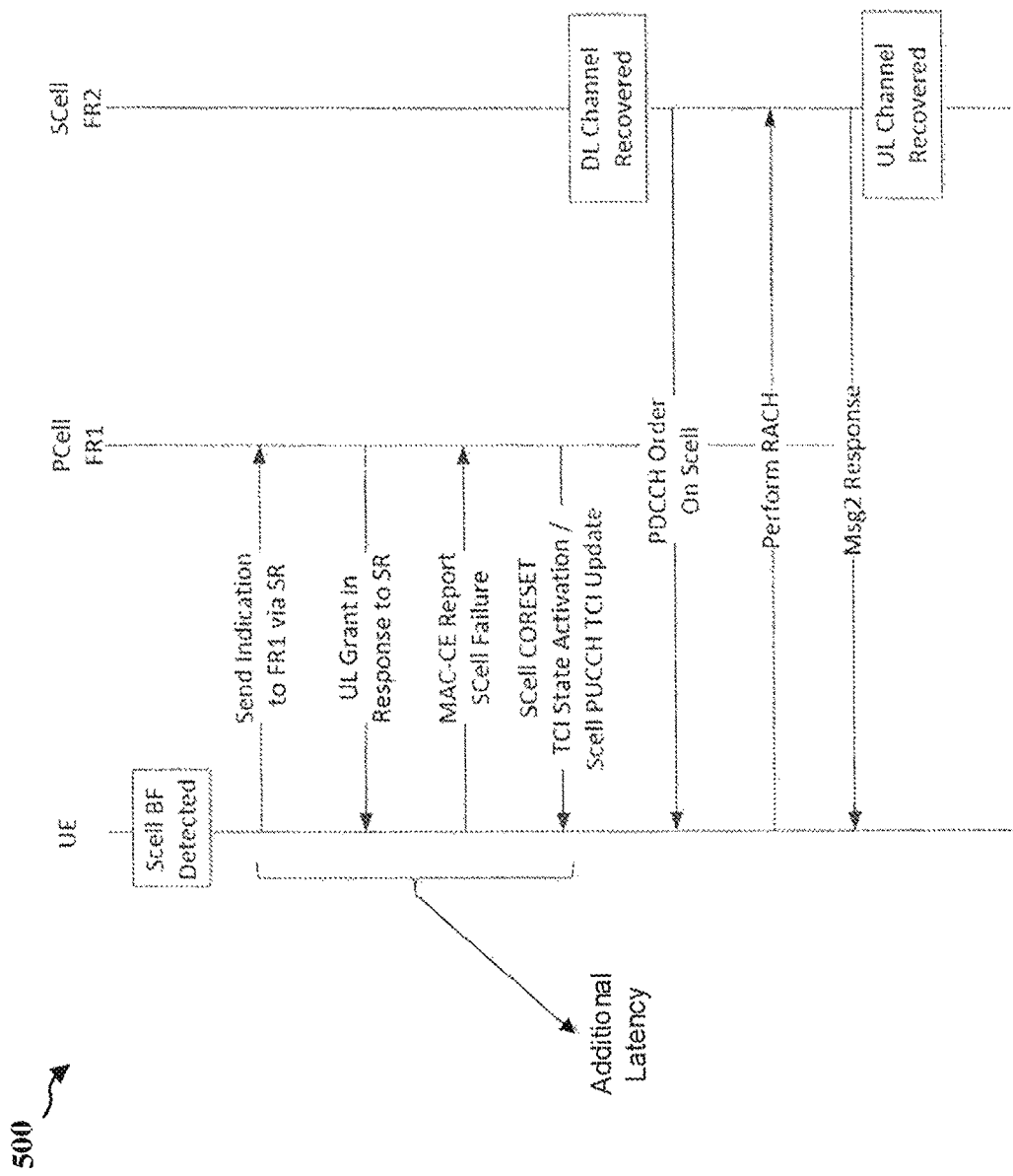
FIG. 5 illustrates a wireless communication system in accordance with certain aspects of the present disclosure.

FIG. 5 illustrates a wireless communication system 500 in accordance with certain aspects of the present disclosure. As shown in FIG. 5, if the SCell detects a beam failure, the UE can send an indication to the PCell in a first frequency (FR1). The PCell can then send an UL grant in response to the scheduling request (SR). After this, the UE can send a MAC-CE report to continue the BFRQ. This MAC-CE report can also indicate the NBI. In some aspects, an NBI report may be necessary if the PCell and the SCell are in different frequency bands. As shown in FIG. 5, the PCell can use a first frequency while the SCell can use a second frequency (FR2). Also, a new or replacement beam in the PCell may not be a new or replacement beam in the SCell. Accordingly, an NBI report may be necessary to identify a new or replacement beam for the SCell beam recovery using the PCell. As such to proceed with the BFR, aspects of the present disclosure may determine which beam is a new or replacement beam in the SCell. Aspects of the present disclosure may not be able to determine a candidate SCell replacement beam by performing a RACH procedure with the PCell. In some aspects, e.g., when the SCell provides a PDCCH order, the UE can perform a RACH procedure with the SCell. In these instances, the RACH beam may be the beam indicated in an NBI report. In some aspects, if the BFR procedure is performed for the SCell using the PCell, then a UE may inform the base station which beam is a candidate for the SCell. As such, the BS can be explicitly informed with the PCell.

As indicated above, BFR procedures can utilize the PCell to recover a beam failure on the SCell. In some instances, an NBI report can be in the MAC-CE report. Further, the NBI can include a coded index in the MAC-CE report. Additionally, the PCell can setup the downlink communication with the base station in a subsequent step. Then the UE can perform a RACH to establish the uplink communication. Also, the RACH procedure performed may not need any NBI information. Accordingly, it can be a waste of resources to indicate an NBI report during a RACH procedure, as the selection of the RACH beam indicates the new beam or beam index. Moreover, UEs may determine how to indicate the state when a new or replacement beam is not identified.

Aspects of the present disclosure can determine when to explicitly transmit the NBI report. For example, aspects of the present disclosure may transmit the NBI report if the SCell BFR is sent in the PCell. Indeed, the present disclosure may explicitly convey an NBI report during SCell BFR when the BFRQ is sent in the PCell. Therefore, determining whether to send an NBI report can be dependent on the CC where the BFRQ is transmitted.

Aspects of the present disclosure can also design a BFRQ format to indicate when a new or replacement beam is not identified, i.e., a no new beam state. Further, aspects of the present disclosure can include multiple designs to indicate a no new beam state in the NBI: (1) by indicating there is no new or replacement beam using a reserved index, or (2) by indicating there is no new or replacement beam using different formats of BFRQ. For instance, one format may include a NBI field, while another formant may not include an NBI field. For example, when a base station expects to receive NBI, e.g., when both an SCell candidate beam list and an RSRP threshold are configured, but the base station detects a BFRQ format without an NBI field, then the base station can be notified that the UE has not identified a new or replacement beam.

Some aspects of the present disclosure can indicate whether to explicitly transmit an NBI report. In some instances, determining whether to send an NBI report may depend on which carrier the BFRQ is transmitted. For instance, the NBI report may be explicitly sent if the BFRQ is sent in a CC that does not include a quasi-co-location (QCL) with the SCell. For example, the NBI report may be explicitly sent if the BFRQ is sent in the PCell.

In some aspects, if the BFRQ is sent in the SCell, e.g., as RACH signaling, then the selection of the RACH beam may already indicate the new or replacement beam. Accordingly, there may be no need to send the NBI report explicitly in the BFRQ when performing a RACH procedure with the SCell. Indeed, the RACH procedure can indicate the NBI, so there is no need to explicitly send the NBI report. In these aspects, the selection of the RACH beam can indicate that the UE understands the RACH configuration of the base station, so the UE may perform a RACH procedure on a certain beam. As such, if the UE performs a RACH procedure on a certain beam, the base station may receive that beam. However, if the BFRQ is sent for the SCell in the PCell, then the NBI report may be explicitly conveyed in the BFRQ.

Some aspects of the present disclosure can also indicate how to convey that a new or replacement beam has not been identified. In some instances, aspects of the present disclosure can indicate a new or replacement beam has not been identified when a BFRQ is sent in the PCell. Accordingly, in some instances, there may not be a new or replacement beam that is found using the RACH procedure on the PCell. In these instances, if the UE cannot identify a new or replacement beam, it may try to perform a RACH procedure with any beam. In some aspects, a base station may not expect to receive an NBI field in the BFRQ when an SCell candidate RS or RSRP threshold is not configured. Likewise, when the candidate RS or RSRP threshold is configured, the base station may expect to receive an NBI field. Further, in some aspects, the UE can convey the NBI during a BFR procedure if a new candidate beam RS and corresponding threshold are configured and/or if the channel quality of the candidate beam is greater than or equal to a threshold.

In some aspects, when a new or replacement beam is not identified, aspects of the present disclosure can utilize multiple ways to indicate the beam recovery state. In one aspect, the present disclosure can utilize a reserved index, e.g., an additional bit, in the NBI field to indicate whether a new or replacement beam is not identified. For example, the reserved index in the NBI field can read '0000' to indicate that a new or replacement beam has not been identified. Accordingly, a reserved index value of zero can indicate there is no new or replacement beam. In some instances, the NBI field can indicate that a new or replacement beam has not been identified when the base station expects to receive the NBI report.

In another aspect, the present disclosure can utilize different formats of the BFRQ to indicate whether a new or replacement beam has not been identified. For instance, different BFRQ formats may include an NBI field or may not include an NBI field. In certain aspects, if new or replacement beam has not been identified, aspects of the present disclosure may use the BFRQ format without an NBI field. For example, when the base station is expecting to receive an NBI indication, but it receives a format that does not include a NBI field, then the base station can determine that a new or replacement beam has not been identified. In some aspects, the base station can perform a blind decoding to determine the BFRQ format. For example, the base station can perform a blind decoding if the BFRQ is sent on the PUCCH in the PCell. The base station can also decode the header of the BFRQ to determine if an NBI field is present. For example, the base station can decode the header of the BFRQ if the BFRQ is sent in a MAC-CE in the PUSCH, e.g., when using the PCell to recover the SCell.

UEs according to the present disclosure can perform a number of different functions to achieve the aforementioned results. For instance, a UE can detect a beam failure, e.g., in an SCell. In some aspects, a UE can identify a BFD in an SCell by measuring a BFD RS. Upon identifying the BFD, a UE can determine or identify a new or replacement beam, e.g., based on measuring configured candidate RSs.

The UE can also determine the carrier or CC upon which to send the BFRQ. For example, the UE can determine whether to send a BFRQ using an SCell or a PCell. This determination can be based on whether a new or replacement beam is identified. In some aspects, if a new or replacement beam is found, then UEs herein can perform a RACH procedure on the SCell. If a new or replacement beam is not identified, UEs herein can use the PCell to send the BFRQ to the base station. In other aspects, the determination of whether to send a BFRQ using an SCell or a PCell can be based on a resource configuration. For instance, an SCell RACH or a PCell can determine to send the BFRQ. For example, a RACH procedure can be performed in the SCell if the SCell supports a CFRA procedure. Otherwise, aspects of the present disclosure can use a PDCCH in the PCell to transmit the BFRQ to the base station for the SCell.

UEs herein can also determine if an NBI report will be sent with the BFRQ, e.g., based on a determination to transmit the BFRQ on a certain CC. In some aspects, the determination to transmit an NBI report can be further based on whether an SCell candidate RS or RSRP threshold is configured. For example, an NBI report may be explicitly transmitted if the SCell BFRQ is sent with the PCell. In some aspects, the present disclosure may not transmit the NBI report if the SCell BFRQ is transmitted with the SCell or the PCell BFRQ is transmitted with the PCell.

Additionally, UEs herein can transmit the BFRQ to the base station. In some aspects, if the BFRQ is sent in the PCell, then it can be sent in the PUCCH or the PUSCH, e.g., using the MAC-CE in the PUSCH. Also, if the BFRQ is sent in the SCell, it can be sent using a RACH procedure. As mentioned above, when a new or replacement beam is not detected, and the BFRQ is sent in the PCell, UEs herein can convey the beam recovery state by utilizing a reserved index in the NBI field or different formats of the BFRQ. For example, UEs herein can reserve a certain index in the NBI field, e.g., a '0000' value, to convey the beam recovery state. When using different formats of the BFRQ to convey the beam recovery state, one format may have an NBI field, while another format may not have an NBI field.

Moreover, the determination to convey the beam recovery state using either a reserved index or different BFRQ formats may depend on which channel the BFRQ is sent. For instance, the base station can perform a blind decoding to determine the format, e.g., if BFRQ is sent on the PUCCH in the PCell. Also, the base station can decode the header of the BFRQ to determine if the NBI field is present, e.g., if the BFRQ is sent in the MAC-CE in the PUSCH, when using the PCell to recover the SCell. Accordingly, in some aspects, the PUCCH can use a reserved field and the MAC-CE in the PUSCH may use different formats to indicate that a new or replacement beam has not been identified.

Base stations according to the present disclosure can also perform a number of different functions to achieve the aforementioned results. For instance, base stations herein can receive an SCell BFRQ from a UE on either an SCell or a PCell. Accordingly, base stations can include the capability to receive the BFRQ on both cells, but actually receive the BFRQ on one cell. Base stations herein can also identify a new or replacement beam for the SCell based on the BFRQ. For example, if the BFRQ is sent via the SCell, then the new or replacement beam can be determined based on the occasion or beam that performs a RACH procedure. In some aspects, a BFRQ without an NBI report may be a RACH transmitted in resources, where the resources indicate the beam but there may not be any field explicitly indicating the beam. If the BFRQ is sent in the PCell, a new or replacement beam can be determined based on the NBI field. In some instances, a BFRQ with an NBI report may include an explicit field indicating the new beam and/or a field that is scrambled based on the new beam, e.g., a beam index.

In some aspects, a base station may expect that a new or replacement beam will not be indicated when a candidate RS or RSRP is not configured. So there may be some cases where the base station is not expecting the NBI report in the BFRQ. In some instances, if a new or replacement is not found, then a base station can determine there is no new or replacement beam, so there will not be an NBI report. Additionally, a base station can identify that a new or replacement beam was not identified or found by the UE. In other aspects, if a base station expects to receive an NBI field, but the BFRQ format indicates that a new or replacement beam was not found, then the base station can identify that the UE did not find a new or replacement beam. Also, if a base station detects a certain bit or index in a certain field in the BFRQ, e.g., the NBI field, then the new or replacement beam can be identified.

In some aspects, based on the BFRQ and/or the new beam identification, the base station can initiate a BFR procedure with the UE on the SCell. Additionally, if the BFRQ is sent in the PCell, the base station can send a PDCCH to the UE. By doing so, the base station can instruct the UE to perform a RACH procedure in the SCell based on the new beam identification. Some aspects of the present disclosure may use different methods to indicate there is no new or replacement beam, e.g., based on which signaling the BFRQ is sent on. For example, when the BFRQ is sent on a PUCCH, the BFRQ can indicate the new beam is not identified in a reserved field in a PUCCH. When the BFRQ is sent on a PUSCH, the BFRQ can indicate the new beam is not identified in a MAC-CE in a PUSCH. Additionally, the BFRQ can indicate the new beam is not identified in an index in the NBI report. In some aspects the new beam may not be identified using a code or bit field. Further, the new beam may not be identified using an index. In some aspects, for each SCell, the SCell BFR MAC-CE may indicate: information regarding a failed SCell index, an indication whether a new candidate beam RS is detected or not, and/or a new candidate beam RS index. In further aspects, the BFRQ can indicate whether the new beam is identified based on at least one BFRQ format. Base stations herein can determine at least one BFRQ format of the BFRQ. Base stations herein can also identify whether the BFRQ indicates the new beam for the first CC based on the determined at least one BFRQ format. Additionally, at least one BFRQ format without a field or index may indicate the new beam is not identified.

Figure 6:
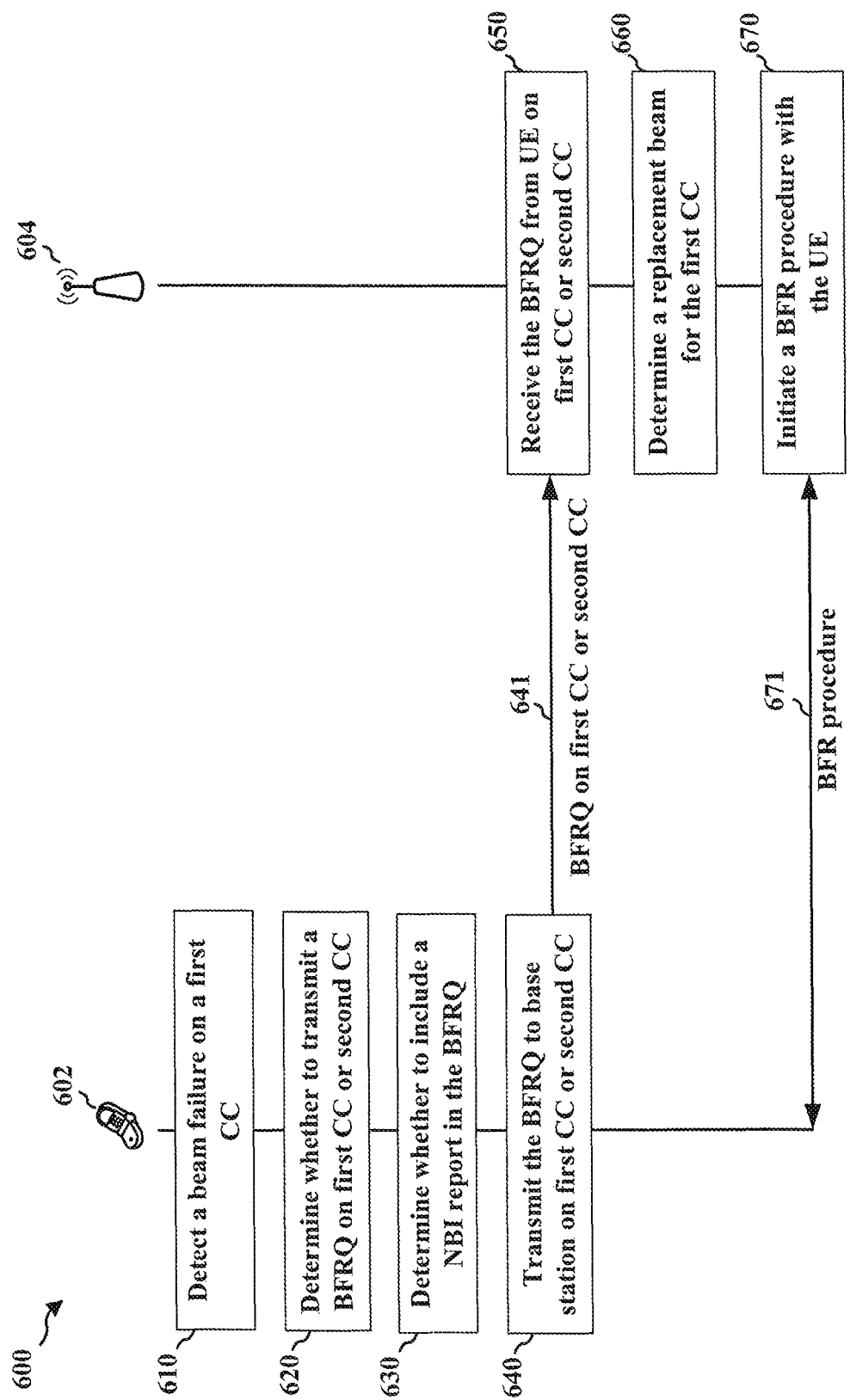
FIG. 6 is a diagram illustrating transmissions between a base station and a UE.

FIG. 6 is a diagram 600 illustrating transmissions between base station 604 and UE 602. For instance, UE 602 can detect 610 a beam failure on a first CC. UE 602 can also measure a BFD RS on the first CC, where the beam failure is detected on the first CC by measuring the BFD RS. UE 602 can also determine 620 whether to transmit a BFRQ to base station 604 on the first CC or a second CC. In some aspects, the first CC can be a secondary cell and the second CC can be a primary cell. Also, the determination to transmit the BFRQ on the first CC or a second CC can be based on whether a new beam for the first CC is identified or can be based on a resource configuration for the first CC or the second CC.

UE 602 can also determine 630 whether to include a NBI report in the BFRQ. In some aspects, the determination to include the NBI report in the BFRQ can be based on the determination to transmit the BFRQ to the base station 604 on the first CC or the second CC. Additionally, UE 602 can determine whether a candidate RS or RSRP threshold on the first CC is configured. In some aspects, the determination to include a NBI report in the BFRQ can be based on the determination whether a candidate RS or RSRP threshold on the first CC is configured.

UE 602 can also transmit 640 the BFRQ 641 to the base station 604 on the first CC or the second CC. The BFRQ 641 can indicate there is no new beam when the new beam for the first CC is not identified. In some aspects, the BFRQ 641 including the NBI report can be transmitted to the base station 604 on the second CC, where the NBI report includes at least one field or index indicating beam information or indicating there is no new beam. Also, the BFRQ 641 without the NBI report can be transmitted to the base station 604 on the first CC, where the new beam is indicated based on one or more resources of the BFRQ. Moreover, UE 602 can identify the new beam for the first CC. In some instances, the BFRQ 641 can be transmitted to the base station 604 on the first CC using a RACH procedure when the new beam for the first CC is identified.

Additionally, the BFRQ 641 can be transmitted to the base station 604 on the first CC using a RACH procedure. The BFRQ 641 can also be transmitted to the base station 604 on the second CC in a PUCCH or a MAC-CE in a PUSCH. In some aspects, the resource configuration for the first CC can be indicated using a CFRA procedure, where the BFRQ 641 can be transmitted on the first CC based on the indicated resource configuration. Also, the resource configuration for the second CC can be indicated using the PUCCH or the MAC-CE in the PUSCH, where the BFRQ 641 can be transmitted on the second CC based on the indicated resource configuration. Further, the BFRQ 641 can indicate the new beam is not identified in an index in the NBI report. The BFRQ 641 can also indicate the new beam is not identified in a reserved field in a PUCCH or a MAC-CE in a PUSCH. Moreover, the BFRQ 641 can indicate whether the new beam is identified based on at least one BFRQ format. In some aspects, the at least one BFRQ format without a field or index can indicate the new beam is not identified.

Base station 604 can receive 650 the BFRQ 641 from UE 602 on a first CC or a second CC, where the BFRQ 641 indicates a beam failure on the first CC. In some aspects, the BFRQ 641 including the NBI report can be received from the UE 602 on the second CC, where the NBI report includes at least one field or index indicating beam information or indicating there is no new beam. The BFRQ 641 without the NBI report can also be received from the UE 602 on the first CC, where the new beam is indicated based on one or more resources of the BFRQ. Additionally, the BFRQ 641 can be received from the UE 602 on the first CC using a RACH procedure. The BFRQ 641 can also be received from the UE 602 on the second CC in a PUCCH or a MAC-CE in a PUSCH.

Base station 604 can also determine 660 a new beam for the first CC, where the determination of the new beam can be based on a RACH procedure when the BFRQ 641 is received on the first CC or can be based on a NBI report in the BFRQ 641 when the BFRQ 641 is received on the second CC. The determination of the new beam for the first CC can be based on whether the BFRQ 641 indicates the new beam. Also, when determining the new beam for the first CC, the base station 604 can identify whether the BFRQ 641 indicates the new beam for the first CC.

In some aspects, the BFRQ 641 may indicate the new beam is not identified when a candidate RS or RSRP threshold on the first CC is not configured. Also, the BFRQ 641 can include the NBI report when a candidate RS or RSRP threshold on the first CC is configured. The BFRQ 641 can also indicate the new beam is not identified in an index in the NBI report. Moreover, the BFRQ 641 can indicate the new beam is not identified in a reserved field in a PUCCH or a MAC-CE in a PUSCH.

Base station 604 can also initiate 670 a BFR procedure 671 with the UE 602 for the first CC based on the BFRQ 641 and the determination of the new beam. In some aspects, base station 604 can transmit a PDCCH to the UE 602 when the BFRQ 641 is received on the second CC. Additionally, base station 604 can instruct the UE 602 to perform a RACH procedure on the first CC based on the determined new beam. Base station 604 can also determine at least one BFRQ format of the BFRQ. Further, base station 604 can identify whether the BFRQ indicates the new beam for the first CC based on the determined at least one BFRQ format. In some aspects, the at least one BFRQ format without a field or index can indicate the new beam is not identified.

Figure 7:
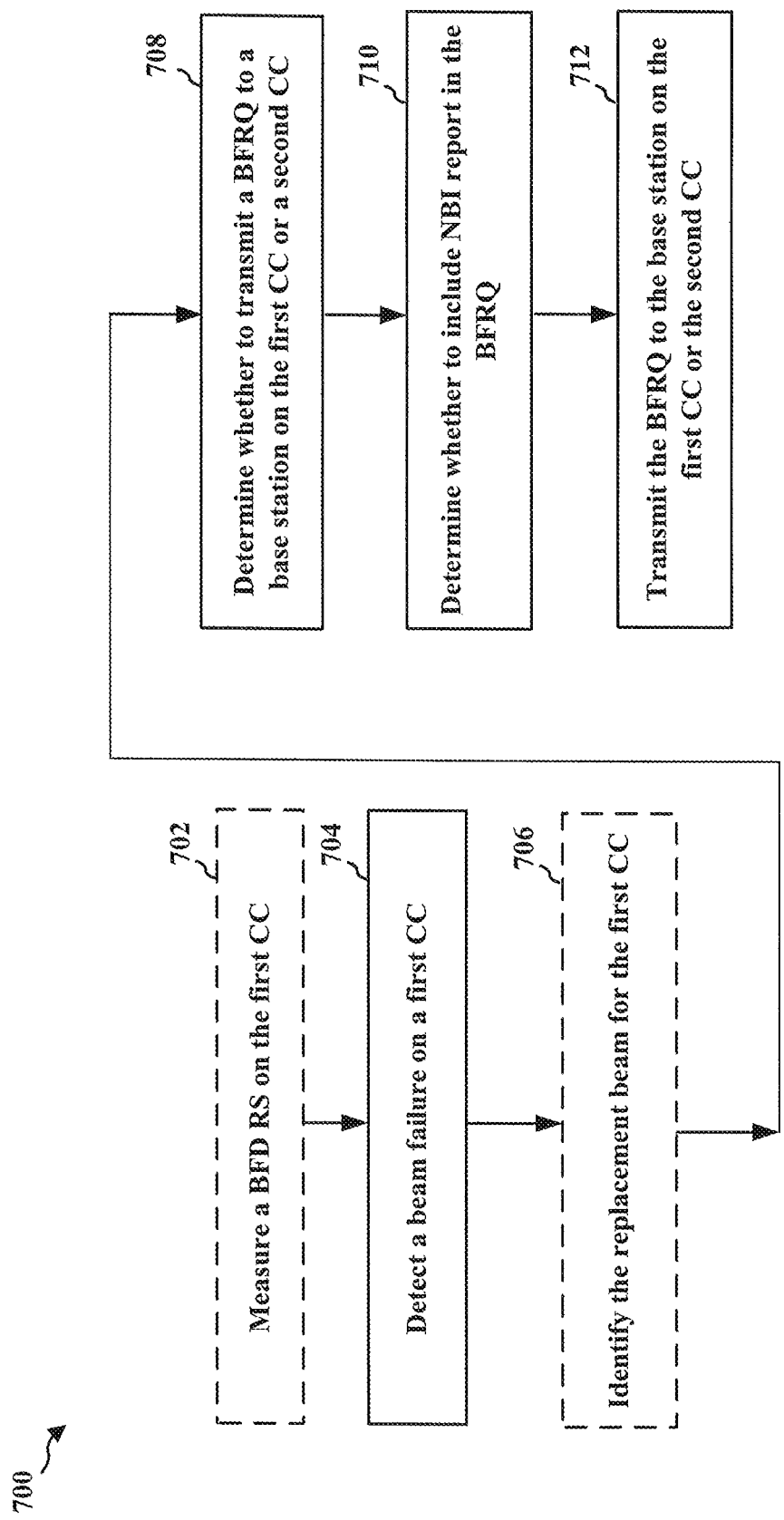
FIG. 7 is a flowchart of a method of wireless communication.

FIG. 7 is a flowchart 700 of a method of wireless communication. The method may be performed by a UE or a component of a UE (e.g., UE 104, 350, 602; the apparatus 802/802'; the processing system 914, which may include the memory 360 and which may be the entire UE or a component of the UE, such as the TX processor 368, the RX processor 356, and/or the controller/processor 359). Optional aspects are illustrated with a dashed line. The methods described herein can provide a number of benefits or advantages, such as improving communication signaling, resource utilization, and/or power savings.

At 702, the UE can measure a BFD RS on a first CC, as described in connection with the examples in FIGS. 4-6. For example, detection component 806 of apparatus 802 can measure a BFD RS on a first CC. At 704, the UE can detect a beam failure on the first CC, as described in connection with the examples in FIGS. 4-6. For example, detection component 806 of apparatus 802 can detect a beam failure on the first CC. In some aspects, the beam failure can be detected on the first CC by measuring the BFD RS, as described in connection with the examples in FIGS. 4-6. At 706, the UE can identify a new beam for the first CC, as described in connection with the examples in FIGS. 4-6. For example, identification component 810 of apparatus 802 can identify a new beam for the first CC.

At 708, the UE can determine whether to transmit a BFRQ to a base station on the first CC or a second CC, as described in connection with the examples in FIGS. 4-6. For example, determination component 808 of apparatus 802 can determine whether to transmit a BFRQ to a base station on the first CC or a second CC. In some aspects, the first CC can be a secondary cell and the second CC can be a primary cell, as described in connection with the examples in FIGS. 4-6. Also, the determination to transmit the BFRQ on the first CC or a second CC can be based on whether a new beam for the first CC is identified or can be based on a resource configuration for the first CC or the second CC, as described in connection with the examples in FIGS. 4-6.

At 710, the UE can determine whether to include a NBI report in the BFRQ, as described in connection with the examples in FIGS. 4-6. For example, determination component 808 of apparatus 802 can determine whether to include a NBI report in the BFRQ. In some aspects, the determination to include the NBI report in the BFRQ can be based on the determination to transmit the BFRQ to the base station on the first CC or the second CC, as described in connection with the examples in FIGS. 4-6. In other aspects, the determination to include a NBI report in the BFRQ can be based on the determination whether a candidate RS or RSRP threshold on the first CC is configured, as described in connection with the examples in FIGS. 4-6.

At 712, the UE can transmit the BFRQ to the base station on the first CC or the second CC, as described in connection with the examples in FIGS. 4-6. For example, transmission component 812 of apparatus 802 can transmit the BFRQ to the base station on the first CC or the second CC. The BFRQ can indicate there is no new beam when the new beam for the first CC is not identified, as described in connection with the examples in FIGS. 4-6. In some aspects, the BFRQ including the NBI report can be transmitted to the base station on the second CC, where the NBI report includes at least one field or index indicating beam information or indicating there is no new beam, as described in connection with the examples in FIGS. 4-6. Also, the BFRQ without the NBI report can be transmitted to the base station on the first CC, where the new beam is indicated based on one or more resources of the BFRQ, as described in connection with the examples in FIGS. 4-6. In some instances, the BFRQ can be transmitted to the base station on the first CC using a RACH procedure when the new beam for the first CC is identified, as described in connection with the examples in FIGS. 4-6.

Also, the BFRQ can be transmitted to the base station on the first CC using a RACH procedure, as described in connection with the examples in FIGS. 4-6. The BFRQ can also be transmitted to the base station on the second CC in a PUCCH or a MAC-CE in a PUSCH, as described in connection with the examples in FIGS. 4-6. In some aspects, the resource configuration for the first CC can be indicated using a CFRA procedure, where the BFRQ can be transmitted on the first CC based on the indicated resource configuration, as described in connection with the examples in FIGS. 4-6. Additionally, the resource configuration for the second CC can be indicated using the PUCCH or the MAC-CE in the PUSCH, where the BFRQ can be transmitted on the second CC based on the indicated resource configuration, as described in connection with the examples in FIGS. 4-6. Further, the BFRQ can indicate the new beam is not identified in an index in the NBI report, as described in connection with the examples in FIGS. 4-6. The BFRQ can also indicate the new beam is not identified in a reserved field in a PUCCH or a MAC-CE in a PUSCH, as described in connection with the examples in FIGS. 4-6. The BFRQ can also indicate whether the new beam is identified based on at least one BFRQ format, as described in connection with the examples in FIGS. 4-6. In some aspects, the at least one BFRQ format without a field or index can indicate the new beam is not identified, as described in connection with the examples in FIGS. 4-6.

Figure 8:
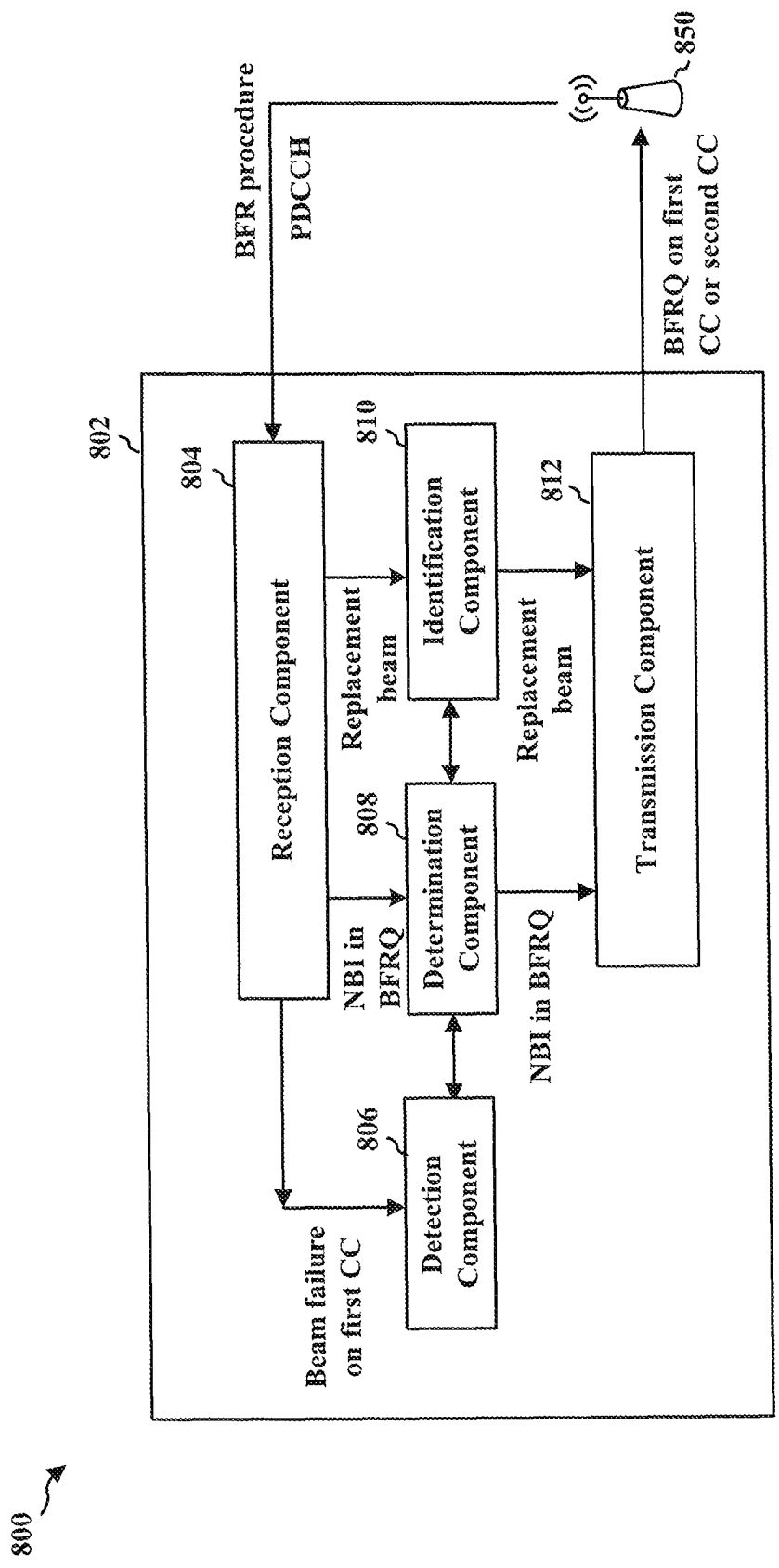
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE or a component of a UE (e.g., UE 104, 350, 602). The apparatus includes a reception component 804 that is configured to receive communication from the base station 850, e.g., a BFR procedure. The apparatus also includes a detection component 806 that is configured to detect a beam failure on a first CC, e.g., as described in connection with step 704 in FIG. 7. Detection component 806 can also be configured to measure a BFD RS on a first CC, as described in connection with step 702 in FIG. 7. The apparatus also includes a determination component 808 configured to determine whether to transmit a BFRQ to a base station on the first CC or a second CC, e.g., as described in connection with step 708 in FIG. 7. The determination component 808 can also be configured to determine whether to include an NBI report in the BFRQ, e.g., as described in connection with step 710 in FIG. 7. The apparatus also includes an identification component 810 that is configured to identify a new beam for the first CC, e.g., as described in connection with step 706 in FIG. 7. The apparatus also includes a transmission component 812 that is configured to transmit the BFRQ to the base station on the first CC or the second CC, e.g., as described in connection with step 712 in FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
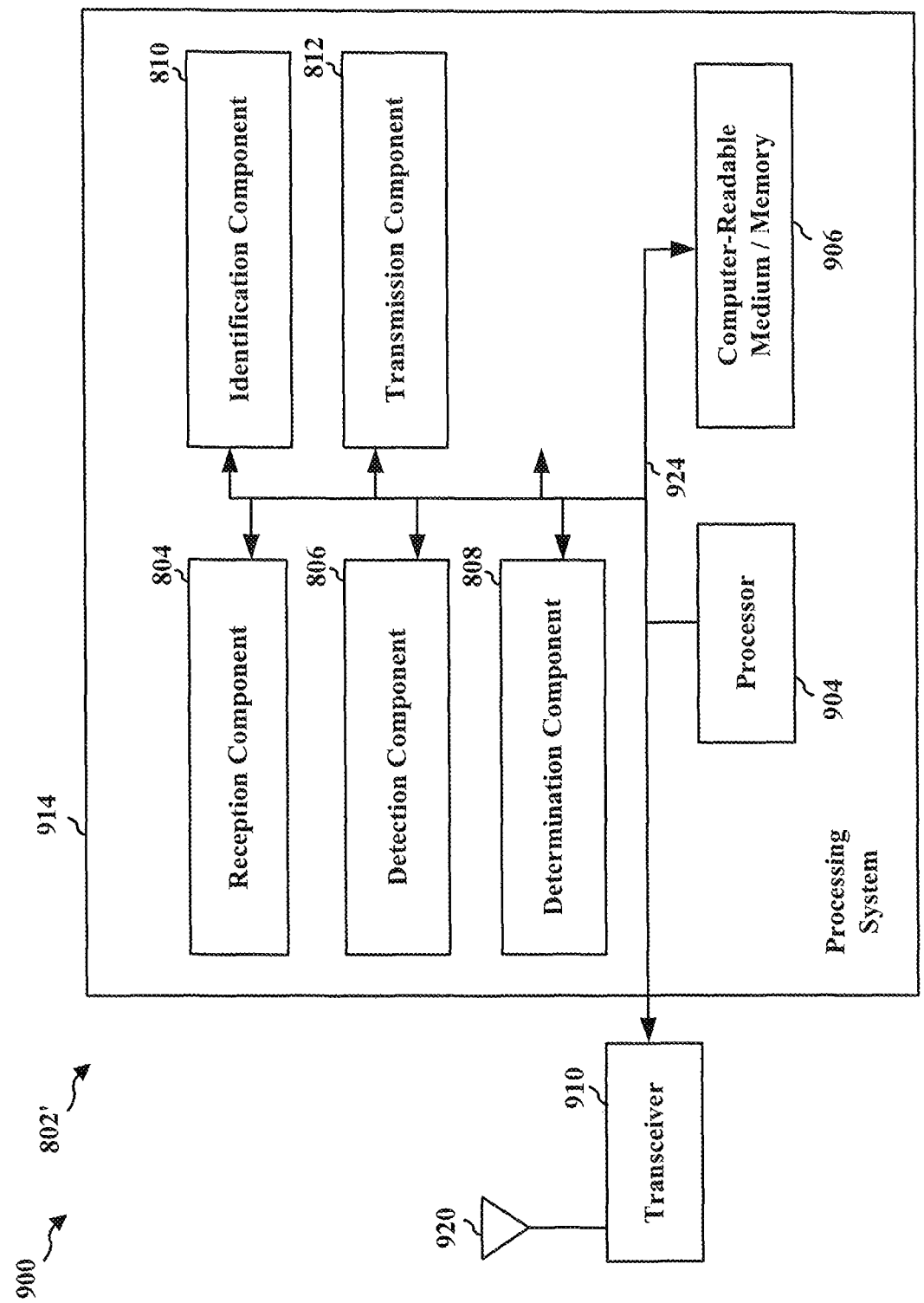
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for detecting a beam failure on a first CC. The apparatus can also include means for determining whether to transmit a beam failure recovery request (BFRQ) to a base station on the first CC or a second CC. The apparatus can also include means for determining whether to include a NBI report in the BFRQ. The apparatus can also include means for transmitting the BFRQ to the base station on the first CC or the second CC. The apparatus can also include means for identifying the new beam for the first CC. The apparatus can also include means for measuring a BFD RS on the first CC. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
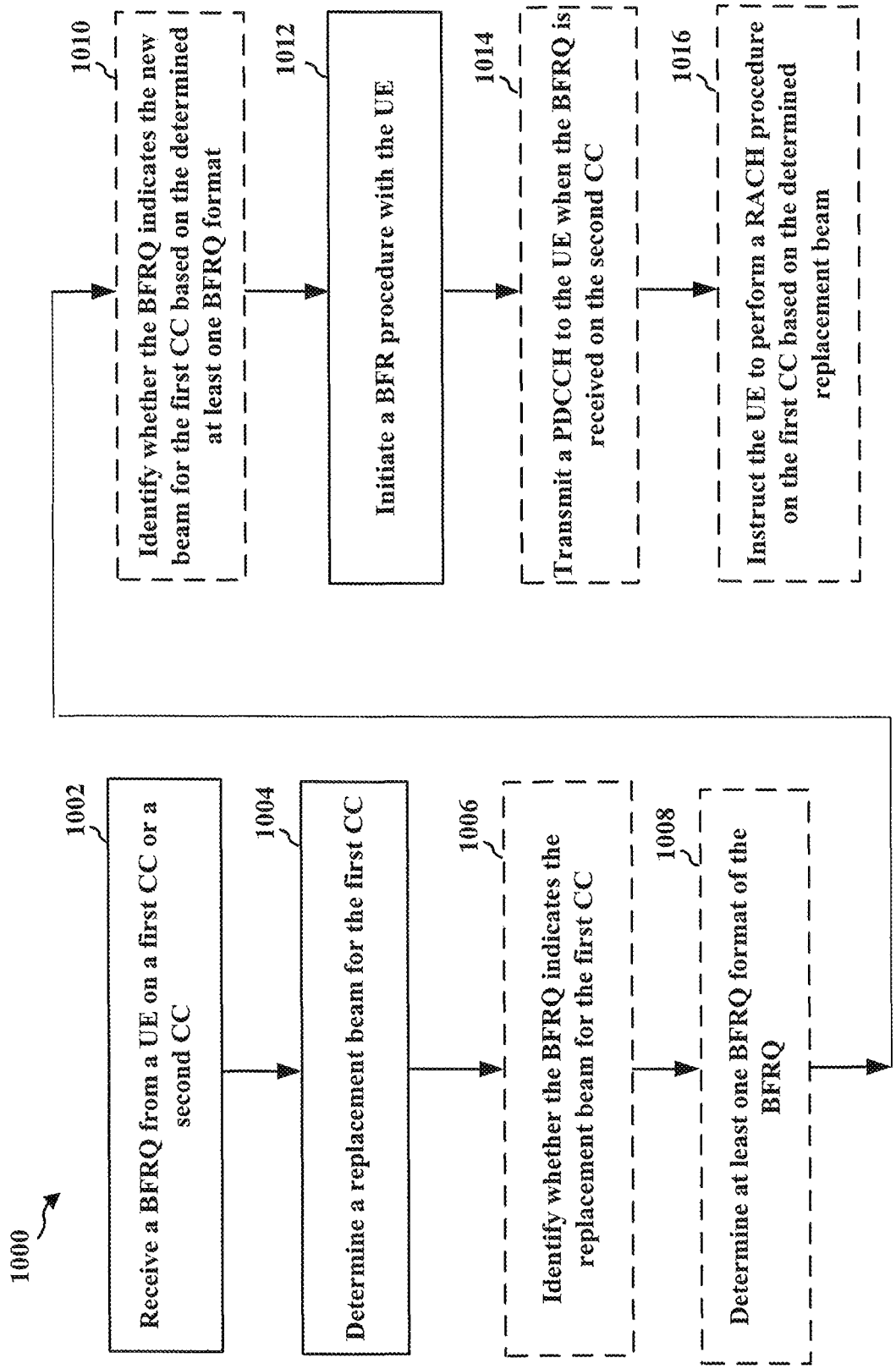
FIG. 10 is a flowchart of a method of wireless communication.

FIG. 10 is a flowchart 1000 of a method of wireless communication. The method may be performed by a base station or a component of a base station (e.g., the base station 102, 180, 310, 604; the apparatus 1102/1102'; the processing system 1214, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits or advantages, such as improving communication signaling, resource utilization, and/or power savings.

At 1002, the base station can receive the BFRQ from UE on a first CC or a second CC, where the BFRQ indicates a beam failure on the first CC, as described in connection with the examples in FIGS. 4-6. For example, reception component 1104 of apparatus 1102 may receive the BFRQ from UE on a first CC or a second CC. In some aspects, the BFRQ including the NBI report can be received from the UE on the second CC, where the NBI report includes at least one field or index indicating beam information or indicating there is no new beam, as described in connection with the examples in FIGS. 4-6. The BFRQ without the NBI report can also be received from the UE on the first CC, where the new beam is indicated based on one or more resources of the BFRQ, as described in connection with the examples in FIGS. 4-6. Additionally, the BFRQ can be received from the UE on the first CC using a RACH procedure, as described in connection with the examples in FIGS. 4-6. The BFRQ can also be received from the UE on the second CC in a PUCCH or a MAC-CE in a PUSCH, as described in connection with the examples in FIGS. 4-6. In some aspects, the first CC can be a secondary cell and the second CC can be a primary cell, as described in connection with the examples in FIGS. 4-6.

At 1004, the base station can determine a new beam for the first CC, where the determination of the new beam can be based on a RACH procedure when the BFRQ is received on the first CC or can be based on a NBI report in the BFRQ when the BFRQ is received on the second CC, as described in connection with the examples in FIGS. 4-6. For example, determination component 1106 of apparatus 1102 may determine a new beam for the first CC. The determination of the new beam for the first CC can be based on whether the BFRQ indicates the new beam, as described in connection with the examples in FIGS. 4-6. At 1006, when determining the new beam for the first CC, the base station can identify whether the BFRQ indicates the new beam for the first CC, as described in connection with the examples in FIGS. 4-6. For example, identification component 1108 of apparatus 1102 may identify whether the BFRQ indicates the new beam for the first CC.

In some aspects, the BFRQ may indicate the new beam is not identified when a candidate RS or RSRP threshold on the first CC is not configured, as described in connection with the examples in FIGS. 4-6. Also, the BFRQ can include the NBI report when a candidate RS or RSRP threshold on the first CC is configured, as described in connection with the examples in FIGS. 4-6. The BFRQ can also indicate the new beam is not identified in an index in the NBI report, as described in connection with the examples in FIGS. 4-6. Moreover, the BFRQ can indicate the new beam is not identified in a reserved field in a PUCCH or a MAC-CE in a PUSCH, as described in connection with the examples in FIGS. 4-6.

At 1008, the base station can also determine at least one BFRQ format of the BFRQ, as described in connection with the examples in FIGS. 4-6. For example, determination component 1106 of apparatus 1102 may determine at least one BFRQ format of the BFRQ. At 1010, the base station can identify whether the BFRQ indicates the new beam for the first CC based on the determined at least one BFRQ format, as described in connection with the examples in FIGS. 4-6. For example, identification component 1108 of apparatus 1102 may identify whether the BFRQ indicates the new beam for the first CC based on the determined at least one BFRQ format. In some aspects, the at least one BFRQ format without a field or index can indicate the new beam is not identified, as described in connection with the examples in FIGS. 4-6. At 1012, the base station can also initiate a BFR procedure with the UE for the first CC based on the BFRQ and the determination of the new beam, as described in connection with the examples in FIGS. 4-6. For example, initiation component 1110 of apparatus 1102 may initiate a BFR procedure with the UE for the first CC based on the BFRQ and the determination of the new beam. At 1014, the base station can transmit a PDCCH to the UE when the BFRQ is received on the second CC, as described in connection with the examples in FIGS. 4-6. For example, transmission component 1112 of apparatus 1102 may transmit a PDCCH to the UE when the BFRQ is received on the second CC. At 1016, the base station can instruct the UE to perform a RACH procedure on the first CC based on the determined new beam, as described in connection with the examples in FIGS. 4-6. For example, transmission component 1112 of apparatus 1102 may instruct the UE to perform a RACH procedure on the first CC based on the determined new beam.

Figure 11:
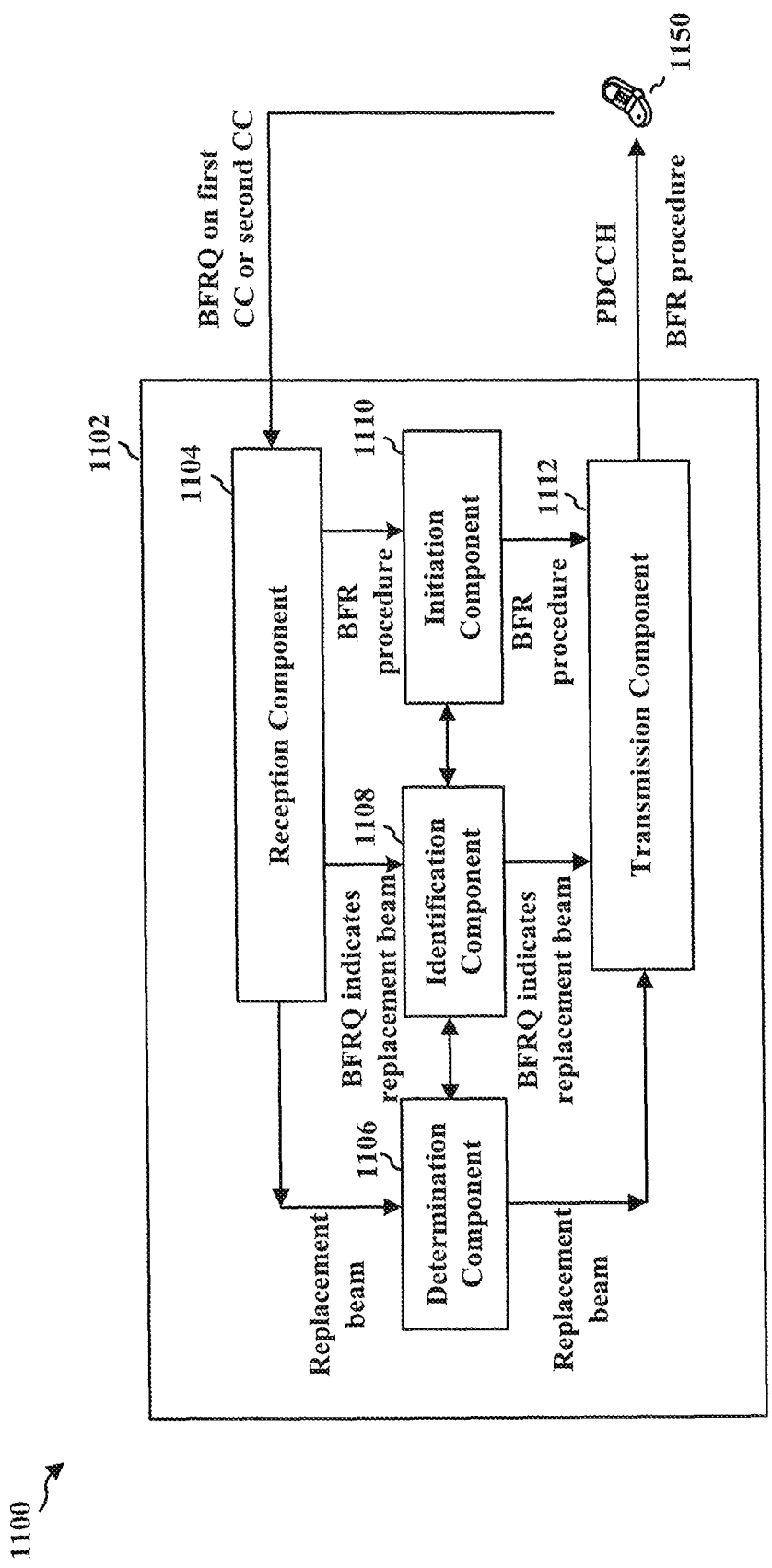
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station or a component of a base station (e.g., base station 102, 180, 310, 604). The apparatus includes a reception component 1104 that is configured to receive a BFRQ from a UE 1150 on a first CC or a second CC, e.g., as described in connection with step 1002 in FIG. 10. The apparatus also includes a determination component 1106 that is configured to determine a new beam for the first CC, e.g., as described in connection with step 1004 in FIG. 10. Determination component 1106 can also be configured to determine at least one BFRQ format of the BFRQ, e.g., as described in connection with step 1008 in FIG. 10. The apparatus also includes an identification component 1108 that is configured to identify whether the BFRQ indicates the new beam for the first CC, e.g., as described in connection with step 1006 in FIG. 10. Identification component 1108 can also be configured to identify whether the BFRQ indicates the new beam for the first CC based on the determined at least one BFRQ format, e.g., as described in connection with step 1010 in FIG. 10. The apparatus also includes an initiation component 1110 that is configured to initiate a BFR procedure with the UE for the first CC based on the BFRQ and the determination of the new beam, e.g., as described in connection with step 1012 in FIG. 10. The apparatus also includes a transmission component 1112 that is configured to transmit a PDCCH to the UE when the BFRQ is received on the second CC, e.g., as described in connection with step 1014 in FIG. 10. Transmission component 1112 can also be configured to instruct the UE to perform a RACH procedure on the first CC based on the determined replacement beam, e.g., as described in connection with step 1016 in FIG. 10.

The apparatus may include additional components that perform each of the blocks of the algorithm in the aforementioned flowcharts of FIGS. 6 and 10. As such, each block in the aforementioned flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
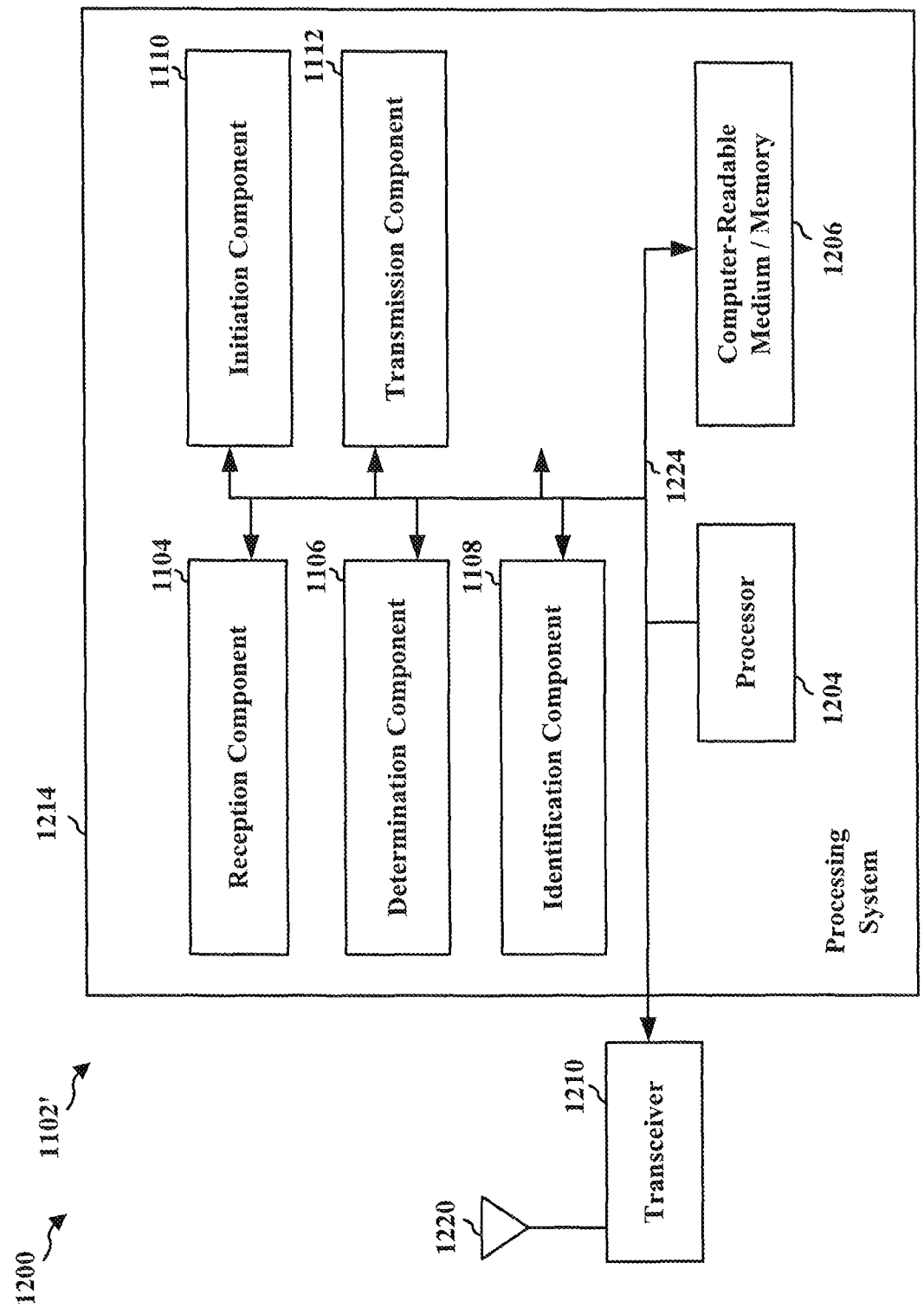
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for receiving a BFRQ from a UE on a first CC or a second CC. The apparatus can also include means for determining a new beam for the first CC. The apparatus can also include means for initiating a BFR procedure with the UE for the first CC based on the BFRQ and the determination of the new beam. The apparatus can also include means for identifying whether the BFRQ indicates the new beam for the first CC. The apparatus can also include means for transmitting a PDCCH to the UE when the BFRQ is received on the second CC. The apparatus can also include means for instructing the UE to perform a RACH procedure on the first CC based on the determined new beam. The apparatus can also include means for determining at least one BFRQ format of the BFRQ. The apparatus can also include means for identifying whether the BFRQ indicates the new beam for the first CC based on the determined at least one BFRQ format. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The subject matter described herein can be implemented to realize one or more benefits or advantages. For instance, the described techniques herein can be used by UEs or base stations to refrain from indicating an NBI report during certain beam recovery procedures, e.g., a RACH procedure. By doing so, aspects of the present disclosure can save valuable beam recovery resources. Further, aspects of the present disclosure can determine how to indicate the beam recovery state when a new or replacement beam is not identified. This can also save the use of valuable beam recovery resources.

The following examples are illustrative only and aspects thereof may be combined with aspects of other embodiments or teaching described herein, without limitation.

Example 1 is a method of wireless communication at a user equipment (UE), comprising: detecting a beam failure on a first component carrier (CC); determining whether to transmit a beam failure recovery request (BFRQ) to a base station on the first CC or a second CC, wherein the determination to transmit the BFRQ on the first CC or the second CC is based on whether a new beam for the first CC is identified or is based on a resource configuration for the first CC or the second CC; determining whether to include a new beam information (NBI) report in the BFRQ; and transmitting the BFRQ to the base station on the first CC or the second CC, wherein the BFRQ indicates there is no new beam when the new beam for the first CC is not identified.

In Example 2, the method of Example 1 further includes that the first CC is a secondary cell and the second CC is a primary cell.

In Example 3, the method of any of Examples 1 or 2 further includes that the determination to include the NBI report in the BFRQ is based on the determination to transmit the BFRQ to the base station on the first CC or the second CC.

In Example 4, the method of any of Examples 1-3 further includes that the BFRQ including the NBI report is transmitted to the base station on the second CC, wherein the NBI report includes at least one field or index indicating beam information or indicating there is no new beam.

In Example 5, the method of any of Examples 1-4 further includes that the BFRQ without the NBI report is transmitted to the base station on the first CC, wherein the new beam is indicated based on one or more resources of the BFRQ.

In Example 6, the method of any of Examples 1-5 further includes identifying the new beam for the first CC.

In Example 7, the method of any of Examples 1-6 further includes that the BFRQ is transmitted to the base station on the first CC using a random access channel (RACH) procedure when the new beam for the first CC is identified.

In Example 8, the method of any of Examples 1-7 further includes that the BFRQ is transmitted to the base station on the first CC using a random access channel (RACH) procedure; or that the BFRQ is transmitted to the base station on the second CC in a physical uplink control channel (PUCCH) or a medium access control (MAC) control element (MAC-CE) in a physical uplink shared channel (PUSCH).

In Example 9, the method of any of Examples 1-8 further includes that the resource configuration for the first CC is indicated using a contention free RACH (CFRA) procedure, wherein the BFRQ is transmitted on the first CC based on the indicated resource configuration.

In Example 10, the method of any of Examples 1-9 further includes that the resource configuration for the second CC is indicated using the PUCCH or the MAC-CE in the PUSCH, wherein the BFRQ is transmitted on the second CC based on the indicated resource configuration.

In Example 11, the method of any of Examples 1-10 further includes that an index in the NBI report of the BFRQ indicates the new beam is not identified.

In Example 12, the method of any of Examples 1-11 further includes that a reserved field in a PUCCH or a MAC-CE in a PUSCH of the BFRQ indicates the new beam is not identified.

In Example 13, the method of any of Examples 1-12 further includes that the BFRQ indicates whether the new beam is identified based on at least one BFRQ format.

In Example 14, the method of any of Examples 1-13 further includes that the at least one BFRQ format without a field or index indicates the new beam is not identified.

In Example 15, the method of any of Examples 1-14 further includes measuring a beam failure detection (BFD) RS on the first CC, wherein the beam failure is detected on the first CC by measuring the BFD RS.

Example 16 is a device including one or more processors and one or more memories in electronic communication with the one or more processors storing instructions executable by the one or more processors to cause the device to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

Example 19 is a method of wireless communication at a base station, comprising: receiving a beam failure recovery request (BFRQ) from a user equipment (UE) on a first component carrier (CC) or a second CC, wherein the BFRQ indicates a beam failure on the first CC; determining a new beam for the first CC, wherein the determination of the new beam is based on a random access channel (RACH) procedure when the BFRQ is received on the first CC or is based on a new beam information (NBI) report in the BFRQ when the BFRQ is received on the second CC; and initiating a beam failure recovery (BFR) procedure with the UE for the first CC based on the BFRQ and the determination of the new beam.

In Example 20, the method of Example 19 further includes that the first CC is a secondary cell and the second CC is a primary cell.

In Example 21, the method of any of Examples 19 or 20 further includes that the BFRQ including the NBI report is received from the UE on the second CC, wherein the NBI report includes at least one field or index indicating beam information or indicating there is no new beam.

In Example 22, the method of any of Examples 19-21 further includes that the BFRQ without the NBI report is received from the UE on the first CC, wherein the new beam is indicated based on one or more resources of the BFRQ.

In Example 23, the method of any of Examples 19-22 further includes that the determination of the new beam for the first CC is based on whether the BFRQ indicates the new beam.

In Example 24, the method of any of Examples 19-23 further includes that determining the new beam for the first CC further comprises: identifying whether the BFRQ indicates the new beam for the first CC.

In Example 25, the method of any of Examples 19-24 further includes that the BFRQ is received from the UE on the first CC using the RACH procedure; or that the BFRQ is received from the UE on the second CC in a physical uplink control channel (PUCCH) or a medium access control (MAC) control element (MAC-CE) in a physical uplink shared channel (PUSCH).

In Example 26, the method of any of Examples 19-25 further includes that the BFRQ includes the NBI report when a candidate RS or RSRP threshold on the first CC is configured.

In Example 27, the method of any of Examples 19-26 further includes that an index in the NBI report of the BFRQ indicates the new beam is not identified.

In Example 28, the method of any of Examples 19-27 further includes that a reserved field in a PUCCH or a MAC-CE in a PUSCH of the BFRQ indicates the new beam is not identified.

In Example 29, the method of any of Examples 19-28 further includes transmitting a physical downlink control channel (PDCCH) to the UE when the BFRQ is received on the second CC; and instructing the UE to perform the RACH procedure on the first CC based on the determined new beam.

In Example 30, the method of any of Examples 19-29 further includes determining at least one BFRQ format of the BFRQ; and identifying whether the BFRQ indicates the new beam for the first CC based on the determined at least one BFRQ format.

In Example 31, the method of any of Examples 19-30 further includes that the at least one BFRQ format without a field or index indicates the new beam is not identified.

Example 32 is a device including one or more processors and one or more memories in electronic communication with the one or more processors storing instructions executable by the one or more processors to cause the device to implement a method as in any of Examples 19-31.

Example 33 is a system or apparatus including means for implementing a method or realizing an apparatus as in any of Examples 19-31.

Example 34 is a non-transitory computer readable medium storing instructions executable by one or more processors to cause the one or more processors to implement a method as in any of Examples 19-31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   detecting a beam failure on a first component carrier (CC);
   determining whether to transmit a beam failure recovery request (BFRQ) to a base station on the first CC or a second CC based on whether a resource configuration configures a resource on one or more of the first CC or the second CC for transmitting the BFRQ, wherein the first CC is associated with a secondary cell and the second CC is associated with a primary cell;
   determining whether to include a new beam information (NBI) report in the BFRQ; and
   transmitting the BFRQ to the base station on the first CC or the second CC based on whether the resource configuration configures the resource on the one or more of the first CC or the second CC.

2. The method of claim 1, wherein the determination to include the NBI report in the BFRQ is based on determination to transmit the BFRQ to the base station on the first CC or the second CC.

3. The method of claim 1, wherein the BFRQ including the NBI report is transmitted to the base station on the second CC, wherein the NBI report includes at least one of a field or an index indicating beam information or indicating there is no new beam.

4. The method of claim 1, wherein the BFRQ is transmitted to the base station on the first CC without the NBI report, a new beam for the first CC being dentified based on one or more resources of the BFRQ.

5. The method of claim 1, further comprising:
identifying a new beam for the first CC.

6. The method of claim 5, wherein the BFRQ is transmitted to the base station on the first CC using a random access channel (RACH) procedure when the new beam for the first CC is identified.

7. The method of claim 1, wherein the BFRQ is transmitted to the base station on the second CC in a physical uplink control channel (PUCCH) or a medium access control-control element (MAC-CE) in a physical uplink shared channel (PUSCH).

8. The method of claim 7, wherein the resource configuration for the first CC is indicated using a contention free RACH (CFRA) procedure, wherein the BFRQ is transmitted on the first CC based on the indicated resource configuration.

9. The method of claim 7, wherein the resource configuration for the second CC is indicated using the PUCCH or the MAC-CE in the PUSCH, wherein the BFRQ is transmitted on the second CC based on the indicated resource configuration.

10. The method of claim 1, wherein an index in the NBI report of the BFRQ indicates there is no new beam.

11. The method of claim 1, wherein a reserved field in a physical uplink control channel (PUCCH) or a medium access control-control element (MAC-CE) in a physical uplink shared channel (PUSCH) of the BFRQ indicates that a new beam is not identified.

12. The method of claim 1, wherein the BFRQ indicates whether the new beam is identified based on at least one BFRQ format.

13. The method of claim 12, wherein the at least one BFRQ format is without a field or index and indicates that the new beam is not identified.

14. The method of claim 1, further comprising:
measuring a beam failure detection (BFD) reference signal (RS) on the first CC, wherein the beam failure is detected on the first CC based on measuring the BFD RS.

15. A method of wireless communication at a network entity, comprising:
receiving a beam failure recovery request (BFRQ) from a user equipment (UE) on a first component carrier (CC) or a second CC based on whether a resource configuration configures a resource on one or more of the first CC or the second CC for receiving the BFRQ, wherein the BFRQ indicates a beam failure on the first CC, wherein the first CC is associated with a secondary cell and the second CC is associated with a primary cell;
determining a new beam for the first CC, wherein a determination of the new beam is based on at least one of a random access channel (RACH) procedure or a new beam information (NBI) report in the BFRQ; and
initiating a beam failure recovery (BFR) procedure with the UE for the first CC based on the BFRQ and the determination of the new beam.

16. The method of claim 15, wherein the BFRQ including the NBI report is received from the UE on the second CC, wherein the NBI report includes at least one of a field or an index indicating beam information or indicating there is no new beam.

17. The method of claim 15, wherein the BFRQ is received from the UE on the first CC without the NBI report, the new beam for the first CC being identified based on one or more resources of the BFRQ.

18. The method of claim 15, wherein the determination of the new beam for the first CC is based on whether the BFRQ indicates the new beam.

19. The method of claim 15, wherein determining the new beam for the first CC further comprises:
identifying whether the BFRQ indicates the new beam for the first CC.

20. The method of claim 15, wherein the BFRQ is received from the UE on the second CC in a physical uplink control channel (PUCCH) or a medium access control-control element (MAC-CE) in a physical uplink shared channel (PUSCH).

21. The method of claim 15, wherein the BFRQ includes the NBI report when at least one of a candidate reference signal (RS) or a reference signal received power (RSRP) threshold on the first CC is configured.

22. The method of claim 15, wherein an index in the NBI report of the BFRQ indicates there is no new beam.

23. The method of claim 15, wherein a reserved field in a physical uplink control channel (PUCCH) or a medium access control-control element (MAC-CE) in a physical uplink shared channel (PUSCH) of the BFRQ indicates the new beam is not identified.

24. The method of claim 15, further comprising:
transmitting a physical downlink control channel (PDCCH) to the UE when the BFRQ is received on the second CC; and
instructing the UE to perform the RACH procedure on the first CC based on the determined new beam.

25. The method of claim 15, further comprising:
determining at least one BFRQ format of the BFRQ; and
identifying whether the BFRQ indicates the new beam for the first CC based on the determined at least one BFRQ format.

26. The method of claim 25, wherein the at least one BFRQ format is without a field or index indicates the new beam is not identified.

27. An apparatus for wireless communication at a user equipment (UE), comprising:
a memory; and
at least one processor coupled to the memory and configured to:
detect a beam failure on a first component carrier (CC);
determine whether to transmit a beam failure recovery request (BFRQ) to a base station on the first CC or a second CC based on whether a resource configuration configures a resource on one or more of the first CC or the second CC for transmitting the BFRQ, wherein the first CC is associated with a secondary cell and the second CC is associated with a primary cell;
determine whether to include a new beam information (NBI) report in the BFRQ; and
transmit the BFRQ to the base station on the first CC or the second CC based on whether the resource configuration configures the resource on the one or more of the first CC or the second CC.

28. The apparatus of claim 27, wherein the determination to include the NBI report in the BFRQ is based on determination to transmit the BFRQ to the base station on the first CC or the second CC.

29. The apparatus of claim 27, wherein the BFRQ including the NBI report is transmitted to the base station on the second CC, wherein the NBI report includes at least one of a field or an index indicating beam information or indicating there is no new beam.

30. The apparatus of claim 27, wherein the BFRQ is transmitted to the base station on the first CC without the NBI report, a new beam for the first CC being identified based on one or more resources of the BFRQ.

31. The apparatus of claim 27, wherein the at least one processor is further configured to:
   identify a new beam for the first CC.

32. The apparatus of claim 31, wherein the BFRQ is transmitted to the base station on the first CC using a random access channel (RACH) procedure when the new beam for the first CC is identified.

33. The apparatus of claim 27, wherein the BFRQ is transmitted to the base station on the second CC in a physical uplink control channel (PUCCH) or a medium access control-control element (MAC-CE) in a physical uplink shared channel (PUSCH).

34. The apparatus of claim 33, wherein the resource configuration for the first CC is indicated using a contention free RACH (CFRA) procedure, wherein the BFRQ is transmitted on the first CC based on the indicated resource configuration.

35. The apparatus of claim 33, wherein the resource configuration for the second CC is indicated using the PUCCH or the MAC-CE in the PUSCH, wherein the BFRQ is transmitted on the second CC based on the indicated resource configuration.

36. The apparatus of claim 27, wherein an index in the NBI report of the BFRQ indicates there is no new beam.

37. The apparatus of claim 27, wherein a reserved field in a physical uplink control channel (PUCCH) or a medium access control-control element (MAC-CE) in a physical uplink shared channel (PUSCH) of the BFRQ indicates that a new beam is not identified.

38. The apparatus of claim 27, wherein the BFRQ indicates whether the new beam is identified based on at least one BFRQ format.

39. The apparatus of claim 38, wherein the at least one BFRQ format is without a field or index and indicates that the new beam is not identified.

40. The apparatus of claim 27, wherein the at least one processor is further configured to:
   measure a beam failure detection (BFD) reference signal (RS) on the first CC, wherein the beam failure is detected on the first CC based on measuring the BFD RS.

41. An apparatus for wireless communication at a network entity, comprising:
   a memory; and
   at least one processor coupled to the memory and configured to:
      receive a beam failure recovery request (BFRQ) from a user equipment (UE) on a first component carrier (CC) or a second CC based on whether a resource configuration configures a resource on one or more of the first CC or the second CC for receiving the BFRQ, wherein the BFRQ indicates a beam failure on the first CC, wherein the first CC is associated with a secondary cell and the second CC is associated with a primary cell;
   determine a new beam for the first CC, wherein a determination of the new beam is based on at least one of a random access channel (RACH) procedure or a new beam information (NBI) report in the BFRQ; and
   initiate a beam failure recovery (BFR) procedure with the UE for the first CC based on the BFRQ and the determination of the new beam.

42. The apparatus of claim 41, wherein the BFRQ including the NBI report is received from the UE on the second CC, wherein the NBI report includes at least one of a field or an index indicating beam information or indicating there is no new beam.

43. The apparatus of claim 41, wherein the BFRQ is received from the UE on the first CC without the NBI report, the new beam for the first CC being identified based on one or more resources of the BFRQ.

44. The apparatus of claim 41, wherein the determination of the new beam for the first CC is based on whether the BFRQ indicates the new beam.

45. The apparatus of claim 41, wherein to determine new beam for the first CC the at least one processor is further configured to:
   identify whether the BFRQ indicates the new beam for the first CC.

46. The apparatus of claim 41, wherein the BFRQ is received from the UE on the second CC in a physical uplink control channel (PUCCH) or a medium access control-control element (MAC-CE) in a physical uplink shared channel (PUSCH).

47. The apparatus of claim 41, wherein the BFRQ includes the NBI report when at least one of a candidate reference signal (RS) or a reference signal received power (RSRP) threshold on the first CC is configured.

48. The apparatus of claim 41, wherein an index in the NBI report of the BFRQ indicates there is no new beam.

49. The apparatus of claim 41, wherein a reserved field in a physical uplink control channel (PUCCH) or a medium access control-control element (MAC-CE) in a physical uplink shared channel (PUSCH) of the BFRQ indicates the new beam is not identified.

50. The apparatus of claim 41, wherein the at least one processor is further configured to:
   transmit a physical downlink control channel (PDCCH) to the UE when the BFRQ is received on the second CC; and
   instruct the UE to perform the RACH procedure on the first CC based on the determined new beam.

51. The apparatus of claim 41, wherein the at least one processor is further configured to:
   determine at least one BFRQ format of the BFRQ; and
   identify whether the BFRQ indicates the new beam for the first CC based on the determined at least one BFRQ format.

52. The apparatus of claim 51, wherein the at least one BFRQ format is without a field or index and indicates that the new beam is not identified.

53. An apparatus for wireless communication at a user equipment (UE), comprising:
   means for detecting a beam failure on a first component carrier (CC);
   means for determining whether to transmit a beam failure recovery request (BFRQ) to a base station on the first CC or a second CC based on whether a resource configuration configures a resource on one or more of the first CC or the second CC for transmitting the BFRQ, wherein the first CC is associated with a secondary cell and the second CC is associated with a primary cell;
   means for determining whether to include a new beam information (NBI) report in the BFRQ; and
   means for transmitting the BFRQ to the base station on the first CC or the second CC based on whether the resource configuration configures the resource on the one or more of the first CC or the second CC.

54. An apparatus for wireless communication at a base station, comprising:
- means for receiving a beam failure recovery request (BFRQ) from a user equipment (UE) on a first component carrier (CC) or a second CC based on whether a resource configuration configures a resource on one or more of the first CC or the second CC for receiving the BFRQ, wherein the BFRQ indicates a beam failure on the first CC, wherein the first CC is associated with a secondary cell and the second CC is associated with a primary cell;
- means for determining a new beam for the first CC, wherein a determination of the new beam is based on at least one of a random access channel (RACH) procedure or a new beam information (NBI) report in the BFRQ; and
- means for initiating a beam failure recovery (BFR) procedure with the UE for the first CC based on the BFRQ and the determination of the new beam.

55. A non-transitory computer-readable medium storing computer executable code for wireless communication at a user equipment (UE), the code when executed by at least one processor causes the at least one processor to:
- detect a beam failure on a first component carrier (CC);
- determine whether to transmit a beam failure recovery request (BFRQ) to a base station on the first CC or a second CC based on whether a resource configuration configures a resource on one or more of the first CC or the second CC for transmitting the BFRQ, wherein the first CC is associated with a secondary cell and the second CC is associated with a primary cell;
- determine whether to include a new beam information (NBI) report in the BFRQ; and
- transmit the BFRQ to the base station on the first CC or the second CC based on whether the resource configuration configures the resource on the one or more of the first CC or the second CC.

56. A non-transitory computer-readable medium storing computer executable code for wireless communication at a network entity, the code when executed by at least one processor causes the at least one processor to:
- receive a beam failure recovery request (BFRQ) from a user equipment (UE) on a first component carrier (CC) or a second CC based on whether a resource configuration configures a resource on one or more of the first CC or the second CC for receiving the BFRQ, wherein the BFRQ indicates a beam failure on the first CC, wherein the first CC is associated with a secondary cell and the second CC is associated with a primary cell;
- determine a new beam for the first CC, wherein a determination of the new beam is based on at least one of a random access channel (RACH) procedure or a new beam information (NBI) report in the BFRQ; and
- initiate a beam failure recovery (BFR) procedure with the UE for the first CC based on the BFRQ and the determination of the new beam.

* * * * *